United States Patent [19]

Eberhardt, Jr.

[11] Patent Number: 4,561,904

[45] Date of Patent: Dec. 31, 1985

[54] CONTROL SYSTEM AND METHOD OF CONTROLLING A DISHWASHING MACHINE

[75] Inventor: Mark E. Eberhardt, Jr., Troy, Ohio

[73] Assignee: Hobart Corporation, Troy, Ohio

[21] Appl. No.: 653,818

[22] Filed: Sep. 21, 1984

[51] Int. Cl.$^4$ .............................................. B08B 3/02
[52] U.S. Cl. .................... 134/18; 134/25.2; 134/57 D; 134/72
[58] Field of Search ................ 134/56 R, 56 D, 57 R, 134/57 D, 58 R, 58 D, 70, 72, 86, 95, 124, 133, 105, 18, 25.2; 198/810, 855, 857, 502

[56] References Cited

U.S. PATENT DOCUMENTS

| | | | |
|---|---|---|---|
| 1,697,220 | 1/1929 | Anstiss | 198/857 X |
| 1,846,083 | 2/1932 | Bowker | 198/857 |
| 1,938,104 | 12/1933 | Jennings | 198/857 |
| 2,986,268 | 5/1961 | Robson et al. | 198/857 |
| 3,356,061 | 12/1967 | Wiggins | 134/58 R X |
| 3,512,624 | 5/1970 | Crane | 198/855 |
| 3,750,129 | 7/1973 | Takeno et al. | 198/810 X |
| 4,319,861 | 3/1982 | Seragnoli | 198/857 |

FOREIGN PATENT DOCUMENTS 7818 1/1981 Japan ................... 198/810
712388 7/1954 United Kingdom ............. 198/857

Primary Examiner—Philip R. Coe
Assistant Examiner—Frankie L. Stinson
Attorney, Agent, or Firm—Biebel, French & Nauman

[57] ABSTRACT

A control system and method of controlling a conveyor-type dishwasher is disclosed, with the dishwasher including a plurality of sequentially arranged work stations, each of the stations performing an operation on ware located therein such as washing, rinsing, drying and the like. A conveyor carries the ware into the dishwasher, past each of the stations, and out of the dishwasher. A sensor mounted at a reference point adjacent the conveyor near the entrance for ware to the dishwasher senses the presence of ware items on the conveyor as the items are carried past the reference point. Positional advance of the conveyor is monitored to define a current conveyor position and track movement of the items through the dishwasher. Controls responsive to the sensor start operations within each of the stations in response to movement of the conveyor sufficient to carry items from the reference point to the station, and stop operations in response to movement of the conveyor sufficient to carry the items from the station.

14 Claims, 37 Drawing Figures

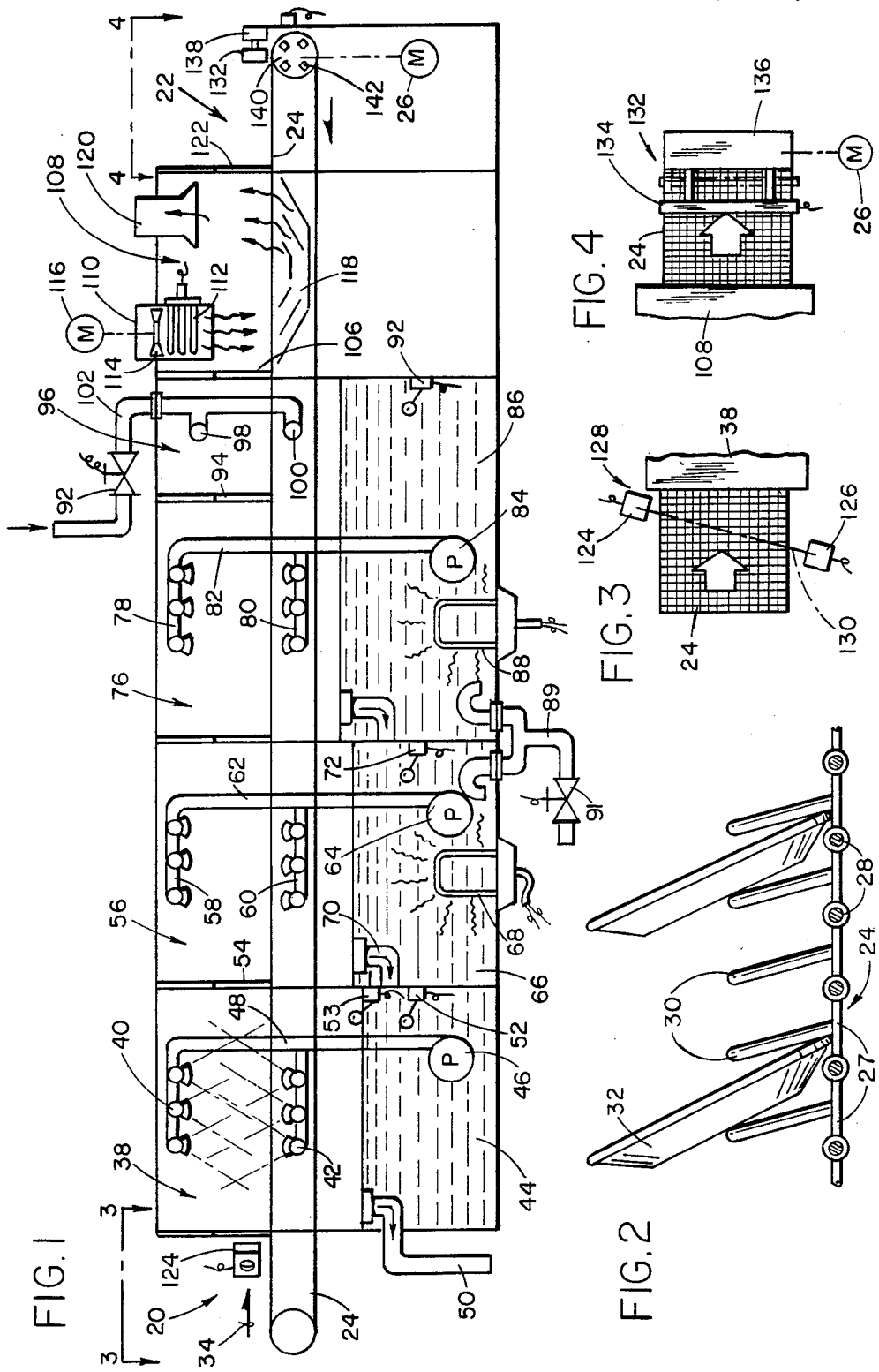

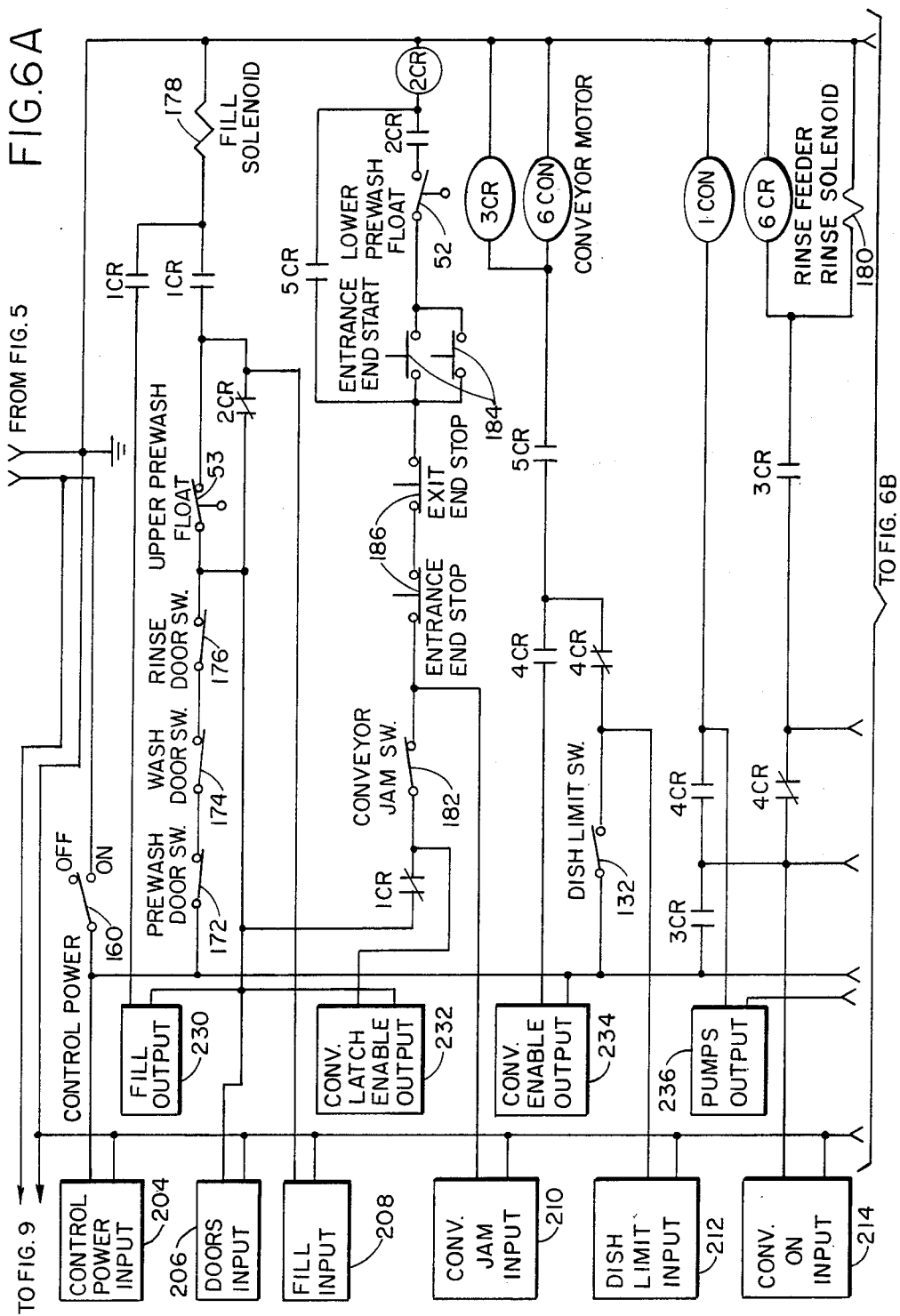

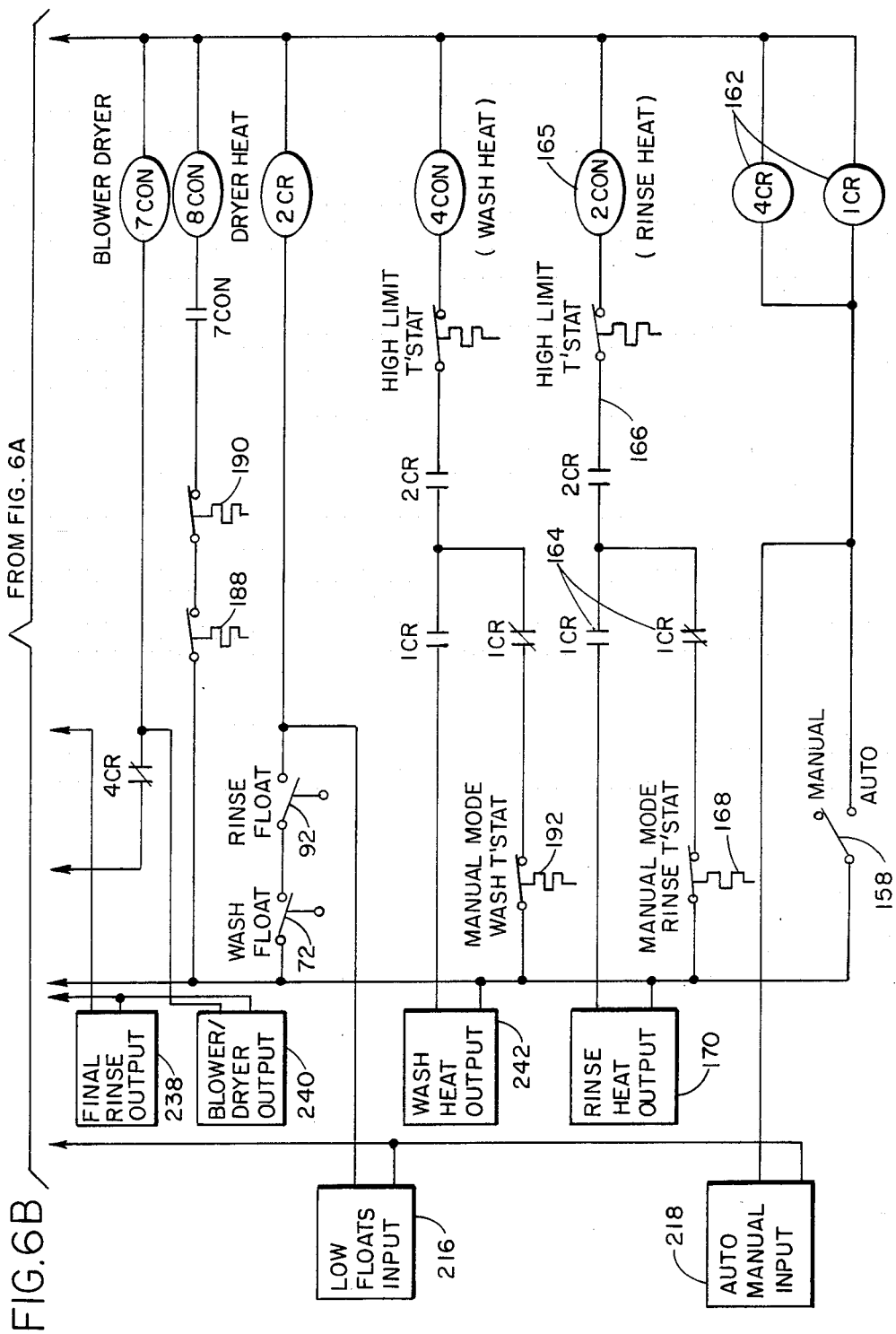

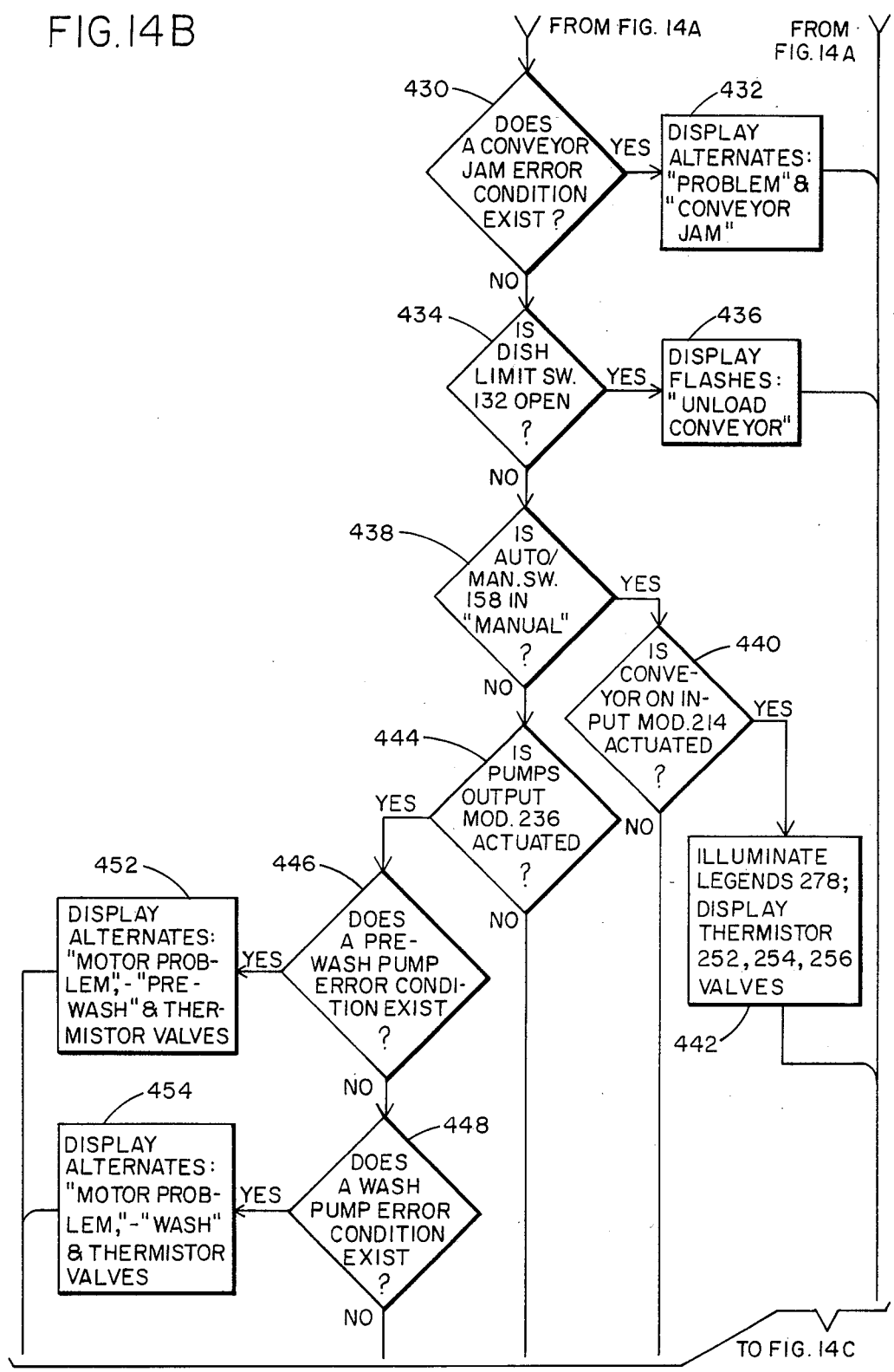

FIG. 20B

FROM FIG. 20A

TO FIG. 20A

602 — PERFORM SUBROUTINE 595 FOR:
- RINSE PUMP ERRORS
- CONVEYOR MOTOR ERRORS
- BLOWER MOTOR ERRORS
- CONVEYOR JAM ERRORS
- POWER UP IN MANUAL ERRORS
- SELF CHECK ERRORS
- PREWASH
- WASH          } OPEN THERMISTOR ERRORS
- RINSE
- FINAL RINSE
- PREWASH
- WASH          } SHORTED THERMISTOR ERRORS
- RINSE
- FINAL RINSE
- LOW WATER - WASH & RINSE ERRORS
- LOW WATER - PREWASH ERRORS

607 — DISPLAY "CLR?" UNTIL SW. 270 OR 274 IS ACTUATED.

608 — HAS SW. 274 BEEN ACTUATED?

YES → 610 CLEAR ALL ERRORS FROM MEMORY

NO

CONTROL SYSTEM AND METHOD OF CONTROLLING A DISHWASHING MACHINE

BACKGROUND OF THE INVENTION

The present invention relates generally to dishwashing machines, and more particularly, to a control system specifically adapted for carrying out a method of controlling a conveyor-type commercial dishwashing machine.

Dishwashers fall into two generally distinct but somewhat overlapping categories, namely, domestic or home machines, and commercial machines such as are used in restaurants, institutions or other public facilities. This latter category is itself divisible into various types of commercial machines.

Two of the most common types of commercial machines are the single rack-type and the conveyor-type. The former includes a single chamber into which a rack of soiled ware can be placed. Within the chamber, the entire cleaning process including washing, rinsing and drying is performed on the rack. Multiple racks must be washed sequentially, with each rack being completely cleaned before the next can be operated upon. A conveyor-type machine, on the other hand, includes a conveyor for carrying individual items or entire racks of ware through multiple stations within the machine. A different operation is carried out at each station, such as washing, rinsing, or drying. Thus, multiple items or racks of ware can be placed on the conveyor and moved continuously through the machine so that, for example, while one item or rack is being rinsed, a preceding item or rack can be dried.

Examples of both of these types of commercial dishwashing machines can be found in U.S. Pat. No. 4,439,242 issued Mar. 27, 1984 to Hadden.

Dishwashers generally, and conveyor-type dishwashers in particular, are relatively energy intensive in their operation. For example, substantial quantities of water heated to at least temperatures of 120° are introduced into the machine at the final rinse stage. Moreover, significant energy is required to drive the two or more pump motors which are typically rated in the range of one horsepower. A relatively large motor is also required to drive the conveyor, and electrical and steam heaters are required to maintain washing liquid at an adequate temperature within the machine tanks. A heater and blower motor are required for the drying operation, and various other components requiring energy input are present throughout the machine. Consequently, it is of great economic advantage to a machine owner for energy usage within the machine to be kept as low as possible.

One of the problems in making a conveyor-type dishwasher energy efficient results from the varying patterns of use that are typical with such machines. During peak periods, such as at meal times, a large quantity of dishware will typically pass through the machine. Therefore, it is not unusual at such times for ware items or racks to pass through the machine at closely-spaced intervals, so that the machine is essentially completely full for extended periods of time. In such a case, there is little waste of energy in having each component at each station of the machine in simultaneous operation.

At other times, such as between traditional meal periods, the dishwashing machine may be used only sporadically, although some ware may still need to be washed. In such a case, small numbers of items or single racks may be placed on the conveyor and moved through the dishwashing machine. In such a case, it makes little sense, for example, to operate the blower motor in the drying station while all the ware within the machine is still at the prewash station.

Some attempt has been made in the past to solve this problem on a limited basis. For example, in U.S. Pat. No. 4,285,352 issued Aug. 25, 1981 to McMahon et al, a conveyor-type dishwashing machine is disclosed in which a contactor switch is positioned along the conveyor path near the entrance to the final rinse station. A rack of ware moving along the conveyor physically contacts and closes the switch, whereupon operation of the final rinse station is commenced. Since heating of final rinse water is a substantial factor in energy demand, this approach conserves energy by reducing the quantities of heated water used within this station. Of course, such a system is limited to only the final rinse station, and is not effective for reducing energy consumption in other stations within the machine.

One possible, more comprehensive approach to reducing energy consumption would be to provide contact switches such as used in McMahon et al at the entrance and exit of each station within the machine. However, while such an approach might perhaps be workable for a machine whicn handles only ware in racks, it cannot be used with a conveyor-type machines having a flight-type conveyor in which individual items of ware can be carried directly by the conveyor without being placed within racks. In such a case, special contact switches or rows of switches would need to be positioned at each station so that a ware item positioned at any point across the width of the conveyor would initiate operation within a particular station. Moreover, physical contact of the switches with the ware items may result in chipping or other damage to breakable ware items such as china. While non-contact switches might seem to avoid this problem, such devices are not practical within the wet and humid environment within the machine, where quantities of water and steam are being moved about.

Another possible solution could be to have operation within each individual station commenced manually by the operator who monitors passage of ware items through the machine. However, careful consideration of such an approach will reveal its impracticality for ware items loaded into the machine in patterns any more complex than single, totally isolated items. Moreover, due to the possibility that entire operations could be inadvertently missed by certain ware items, thereby reducing the cleanliness of such items, it is doubtful whether such an approach could ever obtain approval from health and sanitation authorities.

It can be seen, therefore, that a need exists for a practical control system for use with a conveyor-type dishwasher in which operations within individual stations of a machine can be commenced only as needed. It is important that such a control system be operable with any loading pattern of ware onto the conveyor, regardless of whether the ware is within racks or placed on the conveyor as individual items. Such a system should be automated so that paricular operations are not inadvertently withheld from ware articles. At the same time, the system must be reliable, and malfunctions should not totally shut down the dishwashing capability of the institution at which the machine is used. Such an event could have disastrous consequences were it to take place during peak serving periods. Finally, the system must not be so complex that it substantially increases the cost of the dishwashing machine.

SUMMARY OF THE INVENTION

The present invention meets the foregoing needs by providing a dishwasher having a control system operating in accordance with a method in which a single ware sensor detects the dishware as it enters the machine. Based upon movement of the conveyor, it is determined when the ware should be entering and exiting each station within the machine, so that operation therein can be commenced or terminated. Thus, there is no need to directly sense the presence of ware at each station, and by positioning the sensor outside of the dishwashing machine, various types of sensors can be used reliably.

More particularly, the present invention includes a control system for a conveyor-type dishwasher, and a method of controlling a dishwasher in which the dishwasher includes a plurality of sequentially arranged work stations. Each station includes means for performing an operation on ware located therein, such as washing, rinsing, drying and the like. Each station further includes an entrance and an exit. A conveyor carries ware into the dishwasher, past each of the stations, and then out of the dishwasher.

A sensor means is mounted at a reference point adjacent the conveyor near the entrance for ware to the dishwasher for sensing the presence of ware items on the conveyor as the items are carried past the reference point. A means for monitoring positional advance of the conveyor defines a conveyor position and tracks movement of the items through the dishwasher. A control means responsive to the sensor means and the monitoring means starts the operation performing means within each of the stations in response to movement of the conveyor that is sufficient to carry the items from the reference point to the station. The control means additionally stops the operation performing means in response to movement of the conveyor sufficient to carry the ware items from the station.

The monitoring means may include a means for defining a series of zones of equal size arranged sequentially along the conveyor in the direction of travel of the ware for movement with the conveyor. Means for providing a count having an initial count value is also included, the count means being further operative to increase the count value incrementally for movement of each zone past the reference point to produce a changing current count value. The distance along the conveyor from the reference point to the entrance to one of the stations is defined as a first integer number of zones, and the distance along the conveyor from the reference point to the exit of the station is defined as a second integer number of zones. The sensor means senses the presence of one or more ware items in each one of the zones as the zone is moved past the reference point.

The control means is operative in such a case to be responsive to the sensor means and the count means such that upon sensing the presence of ware within the one zone, the first number is added to the current value of the count to produce a start value. The second number is added to the current value of the count to produce a first stop value, and both the start value and the first stop value are stored. However, in the event an additional stop value has been previously stored whose value is greater than or equal to the start value but less than the first stop value, the additional stop value and the first start value are eliminated.

Upon the current value of the count becoming equal to the start value, operation within the station is commenced. Upon the current value of the count becoming equal to the first stop value, operation within the station is halted.

The zone defining means and the count means may together include a plurality of markers mounted in an equally spaced series for movement along a movement path during movement of the conveyor. A detector means is mounted adjacent the movement path for detecting the passage of each of the markers and generating a signal pulse in response thereto. Each of the zones is then defined as the portion of the conveyor moving past the reference point between two successive signals. The markers may each include a magnet mounted to a member driven by the conveyor drive means, with the detector means including a Hall effect switch.

The sensor means may include source means mounted adjacent the conveyor substantially at the reference point for generating a beam of electromagnetic radiation and directing the beam across the conveyor. Receiving means mounted across the conveyor from the source means continuously receives the beam except when a ware item is moved past the reference point by the conveyor and interrupts the beam, thereby indicating the presence of the item.

The control system may further include switch means connected with the control means, the control means being responsive to the switch means such that upon actuation of the switch means, the control means ignores the start value and first stop value. Instead, the control means causes the operation performing means within the station to operate whenever the conveyor is in operation. In this manner, malfunctions in the automated control system will not result in complete termination of dishwasher operation.

Accordingly, it is an object of the present invention to provide a control system and method of controlling a conveyor-type dishwasher that permits operations within the various stations of the machine to be performed only when ware items are actually present within the particular stations; to provide such a system and method in which the presence of ware items on the conveyor are sensed near the entrance to the machine, after which movement of the conveyor is monitored to determined when such items will be present within each station; to provide such a dishwasher in which the presence of ware on the conveyor can be sensed by means which does not physically contact the ware; and to provide such a system and method in which malfunctions in the control system do not result in complete termination of dishwasher operation.

Other objects and advantages of the present invention will be readily apparently from the following description, the accompanying drawings, and the appended claims.

BRIEF DESCRIPTION OF THE DRAWINGS

FIG. 1 is a schematic side view of a conveyor-type dishwashing machine to which the control system and method of controlling of the present invention is applicable;

FIG. 2 is a side view of a portion of the conveyor of the dishwashing machine of FIG. 1, showing details of the conveyor construction;

FIG. 3 is a view taken generally along line 3—3 of FIG. 1;

FIG. 4 is a view taken generally along line 4—4 of FIG. 1;

FIGS. 6A and 6B together form a schematic diagram of a portion of the control wiring for the dishwashing machine;

DETAILED DESCRIPTION OF THE PREFERRED EMBODIMENT

Figure 5:
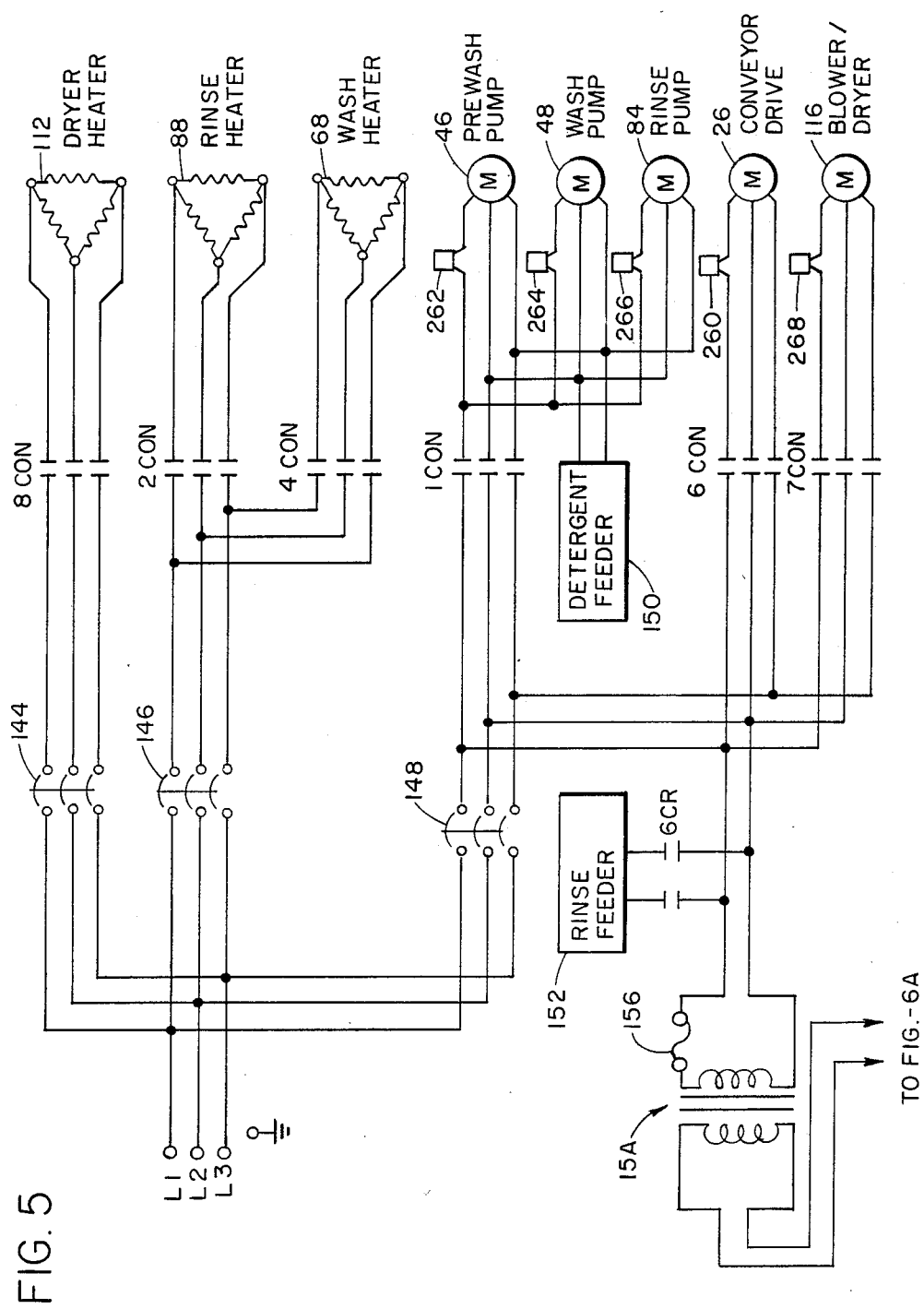
FIG. 5 is a schematic diagram illustrating the wiring for providing electric power to the primary components of the dishwashing machine.

Referring now to the drawings, FIG. 1 illustrates a model of a conveyor-type dishwashing machine to which the present invention is applicable. In such a machine, which is shown from the forward or operator side, soiled ware, either placed in racks or as individual items, are moved through tunnel-like chambers within the machine from an entrance end 20 to an exit end 22 by a conveyor 24. Conveyor 24 is driven at the exit end 22 of the machine by a motor 26.

A portion of conveyor 24 is shown in detail in FIG. 2, from which it can be seen that the conveyor is comprised of a plurality of links or flights 27 which are pivotally connected along a plurality of rods 28 extending across the width of the conveyor. Each flight 27 includes a substantially upright post 30 so that individual dishes 32 and other ware items can be supported by conveyor 24 for cleaning. Typically, relatively large items such as dishes, trays, pots and the like are directly placed on the conveyor as individual items. However, conveyor 24 will also support racks of ware, and generally smaller and/or lighter items such as cups, glasses, utensils and the like are typically placed into racks prior to being placed on the conveyor.

Referring back to FIG. 1, ware placed on the conveyor 24 at the entrance end 20 of the machine is carried in the direction of arrow 34 through a flexible curtain 36 and into a prewash chamber 38. Sprays of liquid from upper and lower prewash manifolds 40 and 42 above and below the conveyor path, respectively, function to flush heavier soil from the ware. The liquid for this purpose comes from a tank 44 via a pump 46 and supply conduit 48. The level in this tank is maintained by a standpipe 50 which overflows to drain. A lower float switch 52 is mounted to the interior of tank 44 to provide a signal to the control system, as will be described in detail below, when tank 44 has been filled sufficiently to cover pump 46. An upper float switch 53 provides a signal when tank 44 is completely filled.

Ware proceeds through a next curtain 54 into a wash chamber 56, where the ware is subjected to sprays of cleansing liquid from upper and lower wash manifolds 58 and 60, respectively, these being supplied through supply conduit 62 by a pump 64 which draws from wash tank 66. A heater, shown as an electrical immersion heater 68, is provided to maintain the temperature of the wash liquid at a suitable level. Not shown, but also included, is a device for adding a cleansing detergent to the liquid in tank 66, along with controls for this device that maintain the concentration of the detergent within desired limits. Overflow from tank 66 exits via pipe 70 into the prewash tank 44. A float switch 72 is mounted within tank 66 so as to be actuated once the level of liquid within tank 66 is sufficiently high that heater 68 and pump 64 are completed submerged.

Ware next proceeds through curtain 74 into rinse chamber 76. Upper and lower rinse manifolds 78 and 80, respectively, spray the ware with rinse liquid supplied through conduit 82 by pump 84 from rinse tank 86. A heater 88 is mounted in tank 86, and overflow from this tank exits through pipe 90 into wash tank 66. A float switch 92 is provided in this tank for actuation when heater 88 and pump 84 are completely submerged.

Water for initially filling tanks 66 and 86, and for maintaining the tanks in a filled condition, is provided through pipe 89 which branches to outlets in both tanks 66 and 86. Pipe 89 is under the control of a solenoid operated fill valve 91.

After passing through curtain 94, the ware enters final rinse chamber 96. This chamber is provided with upper and lower spray heads 98 and 100, respectively, that are supplied with a flow of fresh hot water via pipe 102, under the control of a solenoid operated rinse valve 104. Through suitable electrical controls, as will be described below, energization of valve 104 admits hot rinse water to the spray heads 98 and 100. The fresh water then drains from the ware into tank 86.

The rinsed ware passes through curtain 106 into dryer chamber 108. An inlet vent 110 opens through the top of chamber 108, and has mounted therein an electric heater 112 and a blower fan 114 driven by a motor 116. A baffle structure 118 is mounted beneath the conveyor path, so that the heated air from vent 110 is passed a second time through the conveyor path and exits drying chamber 108 through outlet vent 120.

The cleaned ware exits the dishwashing machine through curtain 122 at exit end 22. The ware is then removed from conveyor 24.

As part of the control system for the dishwashing machine, an optical dish sensor 124 is mounted near the entrance end 20 of the machine. As seen in FIG. 3, sensor 124 includes an infrared light beam source 126 and beam receiver 128. Source 126 directs an infrared beam 130 across conveyor 24 which strikes receiver 128 as long as no ware positioned along conveyor 24 blocks the beam path. When a ware item is carried by conveyor 24 across the path of beam 130, the beam is interrupted, thereby giving an indication that a ware item is entering the dishwashing machine. It will be noted from FIG. 3 that beam 130 is preferably directed across conveyor 24 in an angled fashion so as to reduce the possibility of reflections of the beam from ware items resulting in false indications. Of course, beam 130 could be a beam of electromagnetic radiation other than infrared light, such as visible light, ultraviolet light or even radio waves. Further, in appropriate cases, such as where all ware is held within racks, a contact swtich could be substituted for optical dish sensor 124.

Referring back to FIG. 1, a dish limit switch 132 is mounted at the exit end 22 of the machine at the end of the conveyor path. In one embodiment, seen in FIG. 4, limit switch 132 includes a bar 134 extending across conveyor 24 that is movable with respect to a support structure 136. Ware items which emerge from the machine and approach the end of the conveyor path will contact and depress bar 134, thereby giving the control system an indication that the conveyor 24 should be unloaded. As will be described, conveyor 24 is stopped upon receiving such a signal.

A conveyor movement sensor or detector is mounted at exit end 22 of the machine. A Hall effect switch 138 is positioned adjacent a gear or roller 140 about which conveyor 24 passes. A plurality of magnets 142 serve as markers and are secured to gear or roller 140 in an evenly spaced relationship, so that as conveyor 24 is moved by motor 26, a series of pulses is generated by switch 138.

It should be recognized that the conveyor movement sensor can be some device other than a Hall effect switch. In addition, more or less than four magnets 142 can be used, so long as magnets 142 are evenly spaced. Further, magnets 142 need not be mounted on gear or roller 140, but may be secured to a drive shaft, a separate wheel, or any other member that moves in conjunction with conveyor 24 and motor 26.

The wiring for supplying operating power to the primary components of the dishwashing machine is shown schematically in FIG. 5. Electric power is input at terminals L1 and L2 and L3, and can be from 200 to 500 volts AC, depending upon locally available power supplies. A series of circuit breakers 144, 146, and 148 protect against circuit overloads, with dryer heater 112 being supplied through circuit breaker 144, and wash heater 68 and rinse heater 88 being supplied through circuit breaker 146. Each heater power supply passes through a plurality of contacts associated with a contactor coil 8CON, 2CON or 4CON, as indicated. The coils themselves are located in other portions of the wiring system, as will be described in detail below.

A plurality of motors, including prewash pump 46, wash pump 64, rinse pump 84, conveyor drive motor 26, and dryer blower motor 116 are all supplied through circuit breaker 148. Pumps 46, 64 and 84 are all controlled oy contacts associated with contactor coil 1CON, as is a detergent feeder 150. Thus, pumps 46, 64 and 84 and detergent feeder 150 all operate simultaneously. Conveyor drive motor 26 is controlled by contacts associated with contactor coil 6CON, and blower/dryer motor 116 is controlled by contacts associated with contactor coil 7CON. Rinse feeder 152, which may be used to introduce a chemical sanitizing agent or the like into the fresh water used in the final rinse, is controlled by contacts associated with a control relay 6CR.

Additionally, power supplied through circuit breaker 148 is directed to a transformer 154, protected oy fuse 156, which reduces the line voltage to 120 volts AC, which is supplied to the control circuitry shown in FIGS. 6A and 6B.

A significant feature of the present invention is the capability of the dishwashing machine to be operated either in an automatic or a manual mode. While the manual mode is comparable to typical control systems used in prior art conveyor-type dishwashers, the ability to switch operation of the dishwasher to the manual mode is important in that it enables the machine to continue operation even in the event of a malfunction in the automatic control system.

Referring now to FIGS. 6A and 6B, a switch 158 is provided for selection of either the manual or automatic mode of operation. A control power switch 160 is also provided, and is the normal means by which the dishwashing machine is turned off and on between operational periods. Closing of switches 158 and 160 places the dishwashing machine in the automatic mode and energizes the coils of control relays 1CR and 4CR, shown schematically at 162. Contacts associated with these coils are similarly identified by the designations 1CR and 4CR, with examples being identified as 164. Contactor coils are identified, for example, as coil 2CON shown at 165. Contacts are identified as described above in connection with FIG. 5. This manner of depicting relay and contactor coils and their associated contacts is maintained throughout the drawings.

As an example of the difference between manual and automatic control, consider the control of the rinse heater 88 which is actuated by contactor coil 2CON through line 166. Contacts 164 are both controlled by the coil of control relay 1CR, with one set of contacts being normally open and the other normally closed. In the manual mode, power is supplied to contactor coil 2CON through the manual mode rinse thermostat 168 which is mounted in rinse tank 86. Upon energization of control relay 1CR, by moving switch 158 to the automatic position, the connection between thermostat 168 and contactor coil 2CON is opened, and coil 2CON is instead connected to rinse heat output module 170 which is controlled by a microprocessor as will be described in detail below.

It can be seen from FIGS. 6A and 6B that similar changes are effected by the contacts of control relays 1CR and/or 4CR as a result of changing the position of switch 158.

Other controls shown in FIGS. 6A and 6B include a plurality of door switches 172, 174, and 176. Although not shown in FIG. 1, the dishwashing machine includes an access door located on the operator side of each of the prewash, wash and rinse chambers 38, 56 and 76, respectively. These doors enable an operator to gain access to the interior of these chambers. Each door is provided with a contact switch that is open when the associated door is open, and closed when the door is closed.

A fill solenoid 178 is associated with fill valve 91 that enables water to be introduced into tanks 66 and 86. A rinse solenoid 180 controls rinse valve 104 to permit fresh, heated rinse water to be admitted to final rinse manifolds 98 and 100 for spraying onto the ware.

A conveyor jam switch 182 is provided to open whenever power is supplied to conveyor drive motor 26 but the motor fails to move conveyor 24. Switch 182 can be of a variety of types and may, for example, be responsive to increased current draw by motor 26 or, more preferably, to mechanical torque placed upon the motor mounting structure as a result of the motor attempting to drive a jammed conveyor.

Conveyor start and stop push button controls are provided at each end of the machine near entrance end 20 and exit end 22. The conveyor start switches 184 are connected in parallel, and are both normally open switches. Actuation of either switch energizes the coil of control relay 5CR, which then latches itself to bypass switcnes 184. Stop switches 186 are normally closed switches, and are connected in series such that actuation of either switch 186 interrupts power to and unlatches control relay 5CR. When latched, control relay 5CR permits power to be provided to the coil of contactor coil 6CON for energizing conveyor drive motor 26. Power to the contactor coil 8CON that controls the dryer heater is supplied through contacts associated with contactor coil 7CON that controls blower motor 116. Thus, the dryer heater can be energized only when the blower motor is operating. A regulating thermostat 188 is provided to open at normal operating temperatures in the order of 180° F., and may be operator adjustable. A high limit thermostat 190 is also provided, and opens at temperatures in the order of 400° F. to prevent damage to heater 112 in the event of a control system malfunction.

A manual mode wash thermostat 192 is provided for operation similar to that of rinse thermostat 168. Both wash heater 68 and rinse heater 88 further are protected by high limit thermostats 194 which open at temperatures in the order of 190° F.

It is believed that those skilled in the art will appreciate details regarding operation of a dishwashing machine in the manual mode from further study of FIGS. 6A and 6B.

Figure 7:
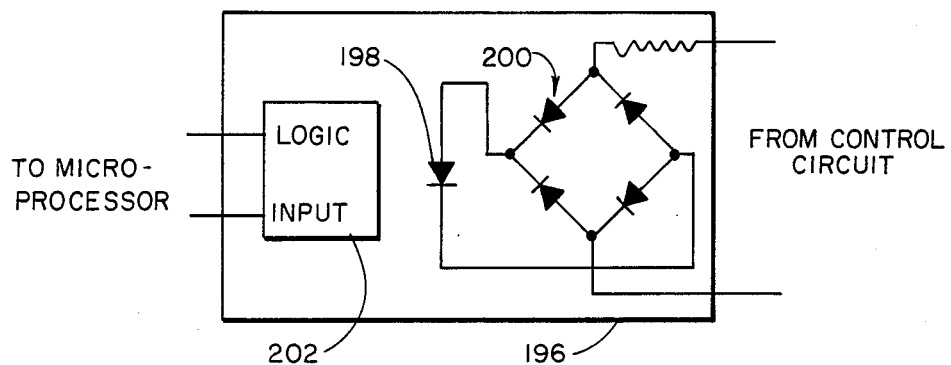
FIG. 7 is a schematic diagram of an exemplary input module used in the wiring of FIGS. 6A and 6B.

The microprocessor-based automatic controls interface with the circuitry of FIGS. 6A and 6B by way of a plurality of input and output modules. An exemplary input module 196 is shown in FIG. 7, and includes a light-emitting diode (LED) 198 connected across a bridge rectifier 200. A logic input unit 202 includes a photodetector, so that when power is input into module 196 from the control circuit, LED 198 emits light which is detected in logic input unit 202 and converted to a logic signal that is sent to the microprocessor.

As shown in FIGS. 6A and 6B, a control power input module 204 detects positioning of control power switch 160 in the on position. A doors input module 206 receives an input when all door switches 172, 174 and 176 are closed. Fill input module 208 is actuated when upper prewash float 53 is closed, indicating that tank 44 has been completely filled.

Conveyor jam input module 210 is responsive to conveyor jam switch 182, while dish limit input module 212 is responsive to dish limit switch 132. Conveyor-on input module 214 detects energization of the conveyor motor (by way of closing of control relay contacts 3CR), and a low floats input module 216 detects opening of either wash float 72 or rinse float 92. Finally, automatic/manual input module 218 is responsive to the positioning of switch 158.

Figure 8:
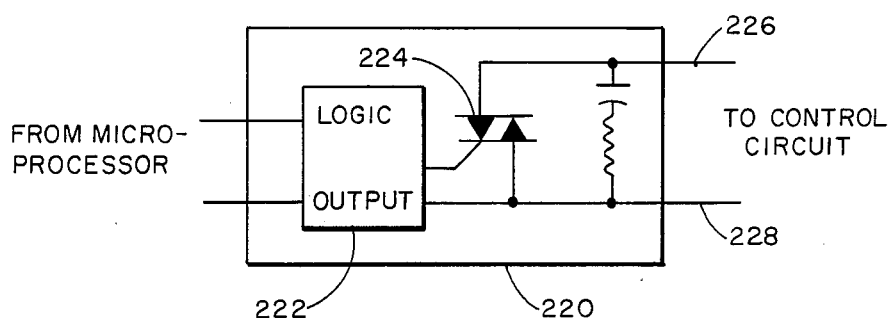
FIG. 8 is a schematic diagram of an exemplary output module used in the wiring diagram of FIGS. 6A and 6B.

An exemplary output module 220 can be seen by reference to FIG. 8. A logic signal from the microprocessor is directed to and optically-isolated logic output unit 222, which in turn triggers triac 224 to permit current to flow through lines 226 and 228 connecting with the control circuitry.

Referring back to FIGS. 6A and 6B, fill output module 230 controls current flow to actuate fill solenoid 178, while conveyor latch enable output module 232 energizes the conveyor latch circuit including start and stop switches 184 and 186, respectively. Conveyor enable output module 234 provides electric current to contactor coil 6CON to energize coveyor motor 26 after actuation of a start switch 184 causes closing of contacts associated with control relay 5CR.

Pumps output module 236 controls energization of the pump motors, final rinse output module 238 actuates rinse solenoid 180, and blower/dryer output module 240 energizes contactor coil 7CON to energize blower motor 116 and, indirectly, contactor coil 8CON to energize dryer heater 112. Wash heat output module 242 and rinse heat output module 170 actuate the wash heater 68 and rinse heater 88, respectively.

Figure 9:
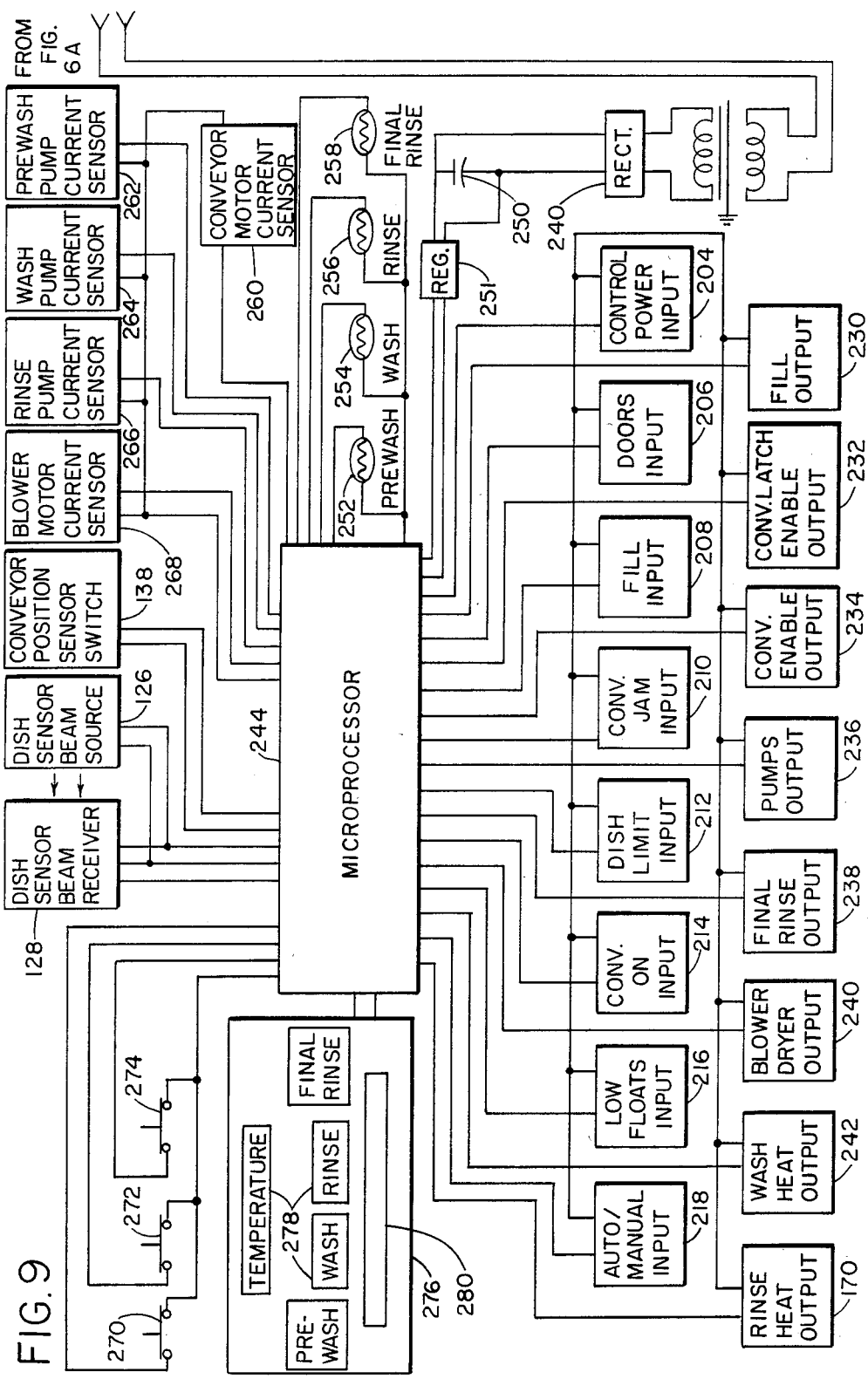
FIG. 9 is a schematic diagram of the remainder of the control wiring for the dishwashing machine.

Referring now to FIG. 9, input modules 204–218 and output modules 170 and 230–242 are connected with a microprocessor 244. While shown as a single component, microprocessor 244 includes a processor chip and various supporting components. However it is believed that in view of the description of the operation of the dishwashing machine contained herein, any specific physical details regarding microprocessor 244 will be known to those skiled in the art. In the preferred embodiment, microprocessor 244 is based upon a Motorola 68705 R3 chip. A transformer 246 reduces the 120 volt AC power from the control circuitry of FIGS. 6A and 6B to an acceptable voltage level, and rectifier 248 converts the alternating current to direct current. A capacitor 250 is included for filtering purposes, and a voltage regulator is also provided.

The preferred chip upon which microprocessor 244 is based includes four analog inputs to which are connected four thermistors 252, 254, 256 and 258. Thermistor 252 is mounted within prewash tank 44, thermistor 254 is mounted in wash tank 66, and thermistor 256 is mounted in rinse tank 86. Thermistor 258 is mounted within the fresh water inlet line 102. Each of the four thermistors is operative to provide microprocessor 244 with inputs for temperature sensing within their respective locations.

Also providing input to microprocessor 244 is a plurality of current sensors that detect current flow in the leads connected to the various drive motors. Conveyor motor current sensor 260 is associated with conveyor drive motor 26, prewash motor current sensor 262 is associated with prewash pump 46, wash motor current sensor 264 is associated with wash pump motor 64, rinse motor current sensor 266 is associated with rinse pump 84, and blower motor current sensor 268 is associated with blower motor 116. Position of these sensors with respect to the corresponding motors can be seen by reference back to FIG. 5. Conveyor position sensor switch 138 and dish sensor beam source 126 and receiver 128 also supply inputs to microprocessor 244. Switch 138, beam source 126 and beam receiver 128 have all been described in detail above.

A plurality of push-button diagnostic switches 270, 272, and 274 are also connected to microprocessor 244. The operation of switches 270, 272 and 274 will be described in connection with the operation of microprocessor 244 below.

Finally, a display panel 276 is connected to microprocessor 244 to provide visual indications to the dishwashing machine operator as to the status and operation of the machine. A plurality of lightable indicators 278 are mounted on display panel 276, and carry the indications "temperature", "prewash", "wash", "rinse" and "final rinse". A sixteen-character alphanumeric display 280 completes display panel 276. Characteric display 280 is controlled by microprocessor 244 to provide informational messages, which can include numeric display of the temperatures within the tanks 44, 66 and 86, and rinse supply line 102, as determined by thermistors 252, 254, 256 and 258. In such a case, indicators 278 are illuminated, with the numeric temperature indications being positioned along character display 280 beneath the appropriate legends.

Figure 10:
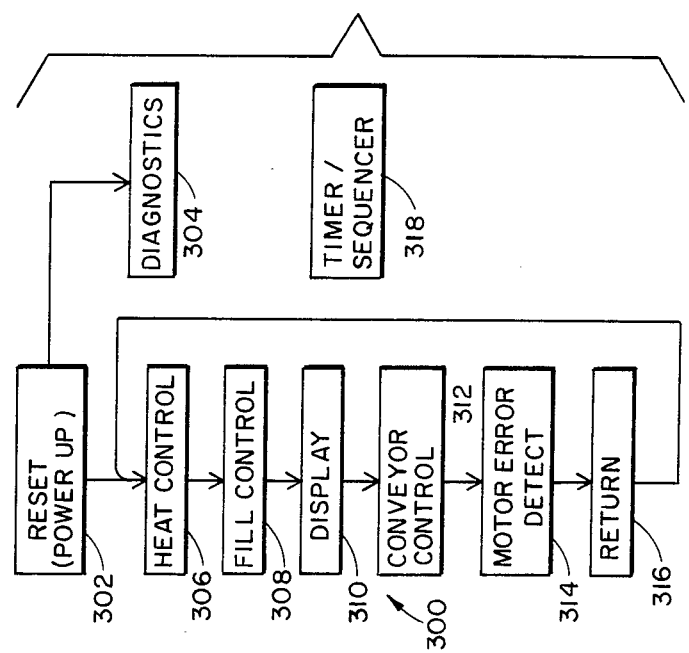
Figure 12A:
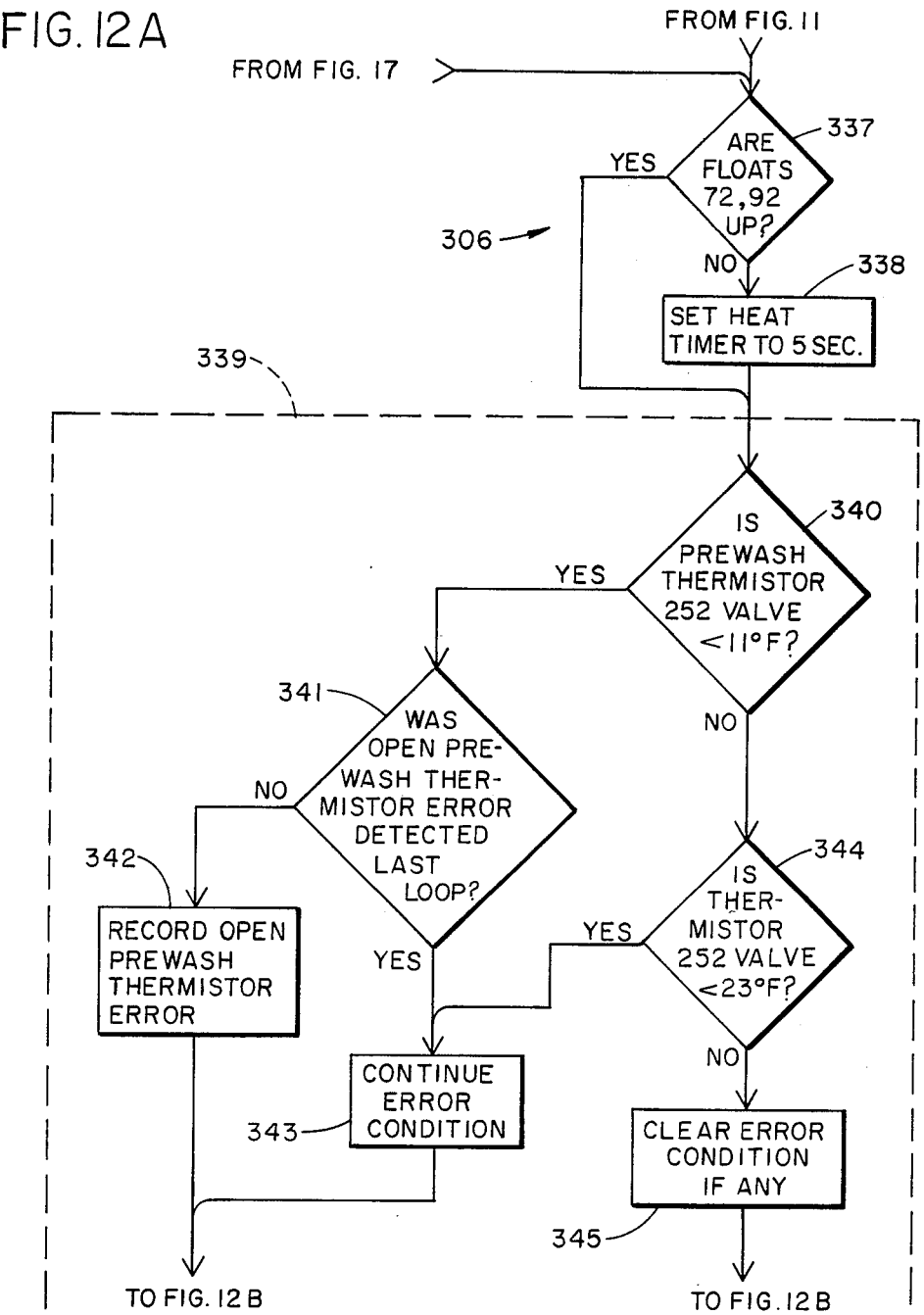
Figure 12B:
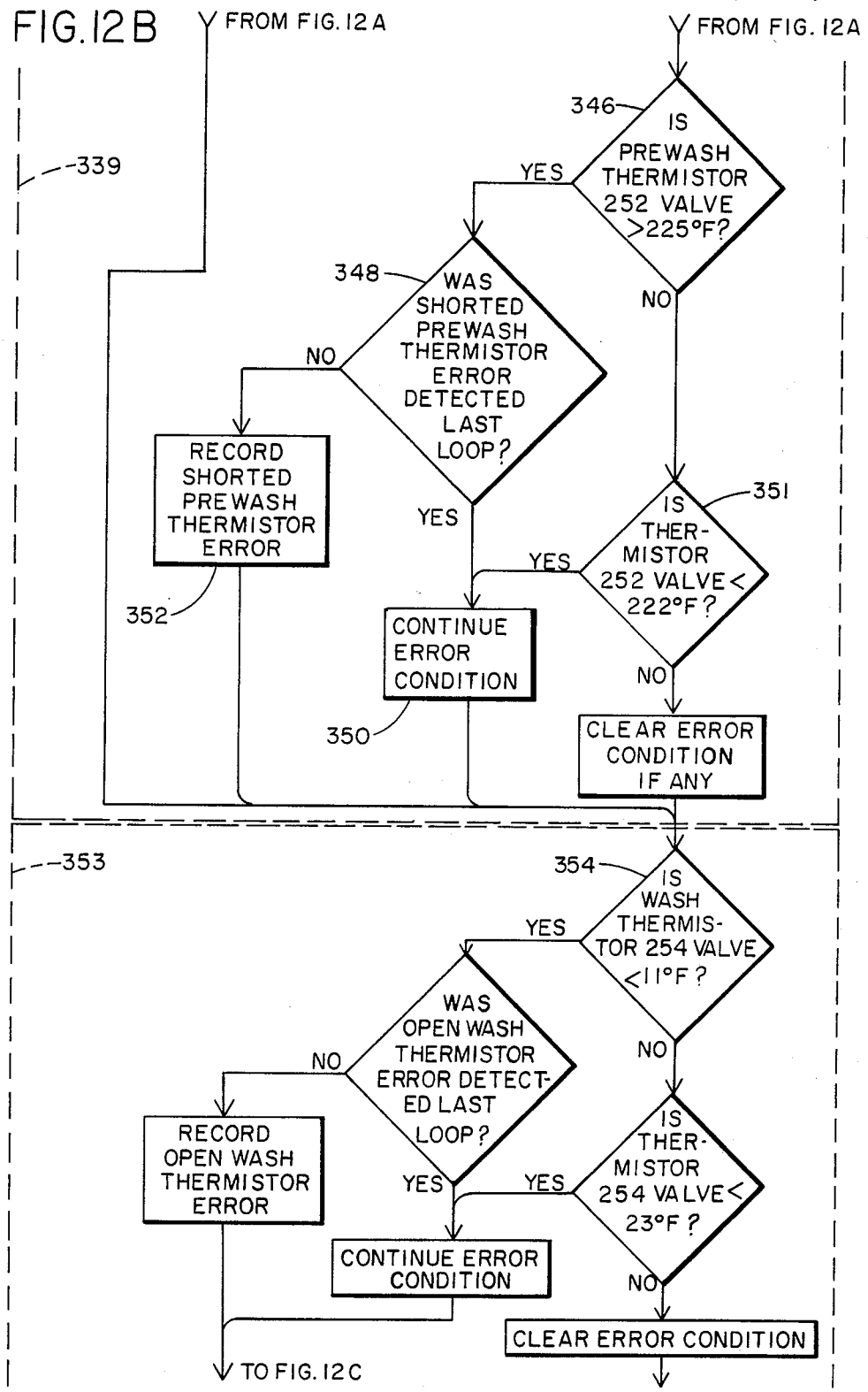
Figure 12C:
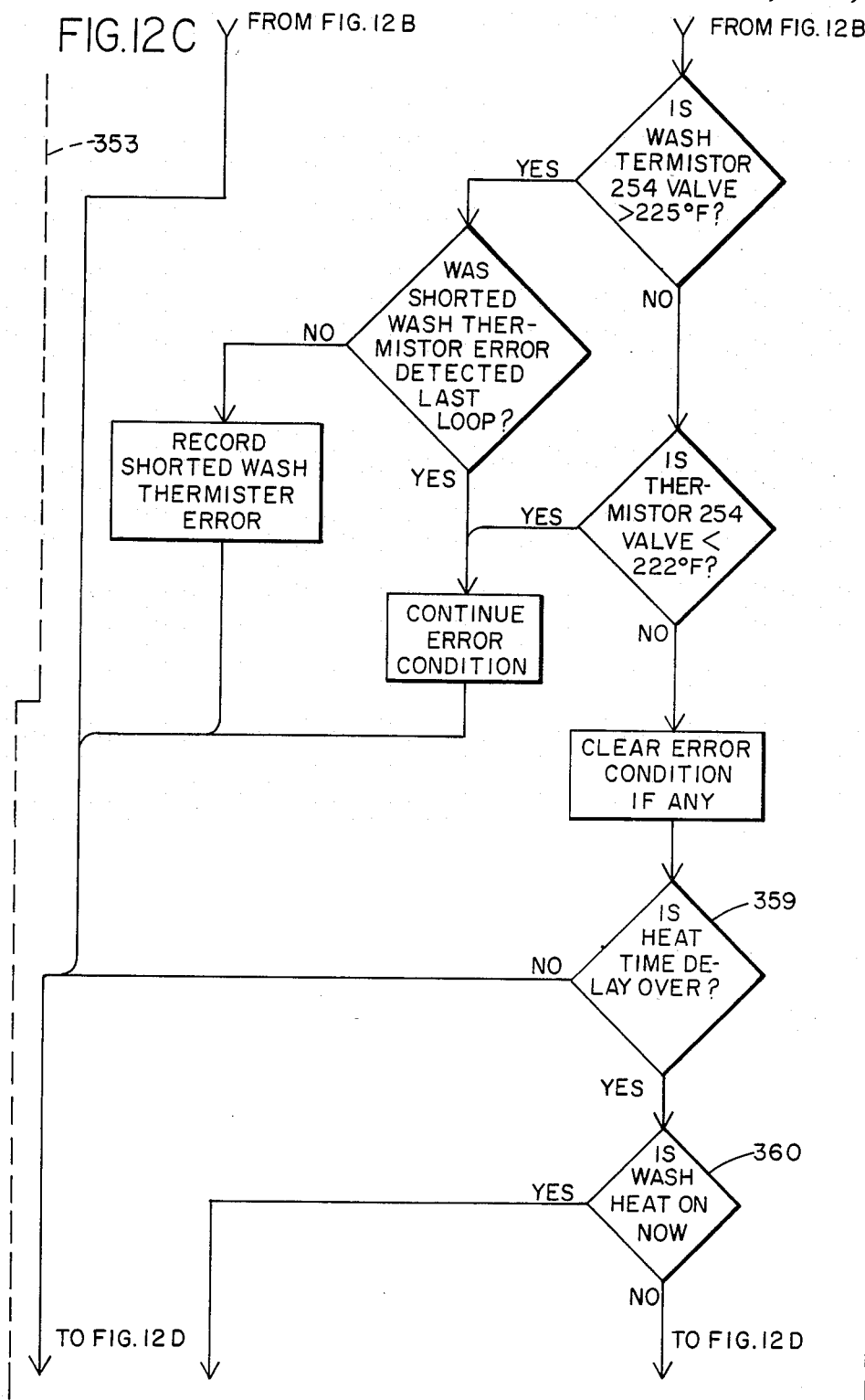
Figure 12D:
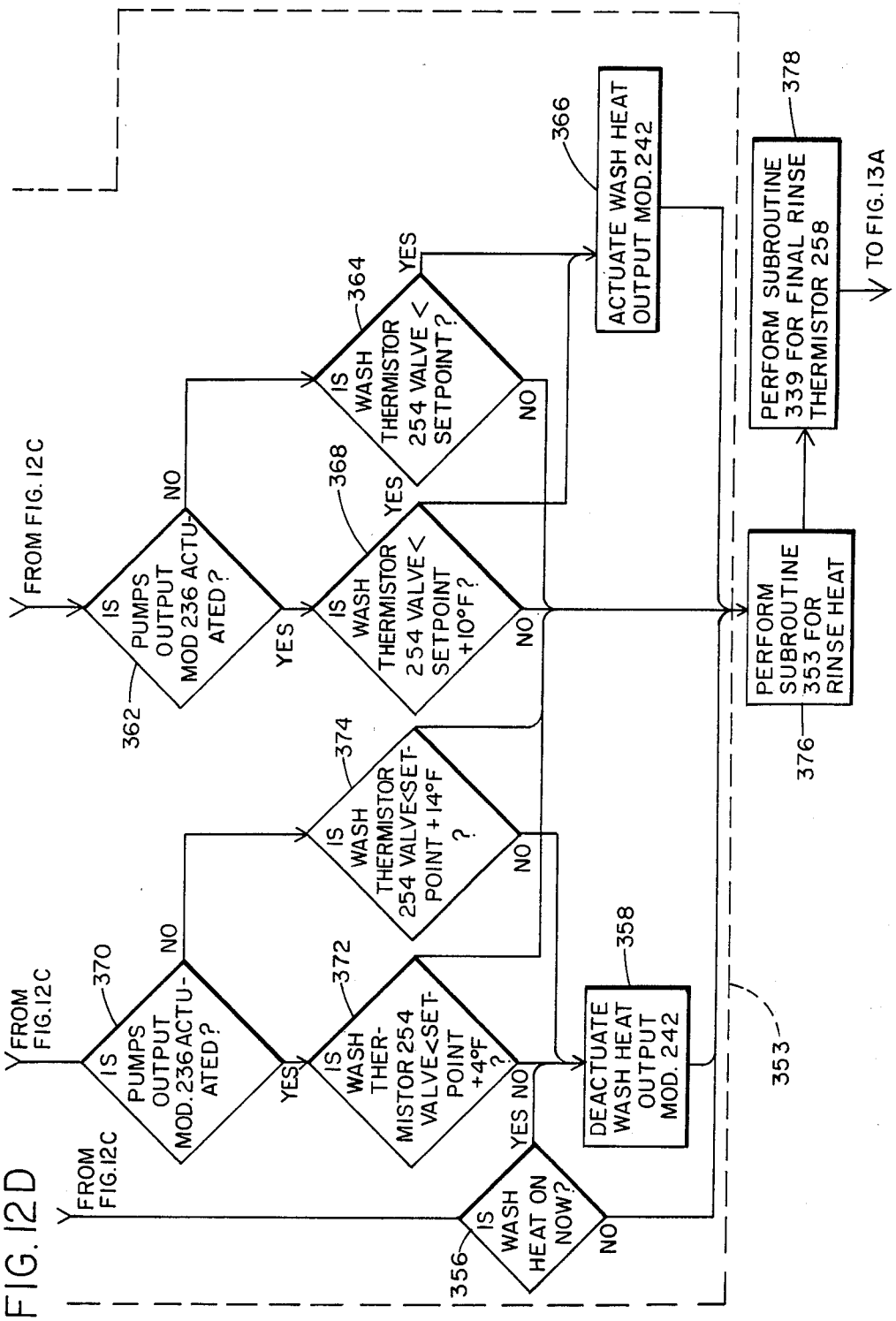

The automatic operation of the dishwashing machine can be understood by reference to the flow chart diagrams shown in FIGS. 10–21D. The basic operational scheme of the machine is shown in FIG. 10, in which the main program loop 300 is shown as being comprised of a plurality of linked program routines. Upon commencement of dishwasher operations, the microprocessor executes the reset or power up routine 302 from which, depending upon operator action, the microprocessor can enter the main program loop or a diagnostics routine 304.

In the main program loop, the microprocessor carries out a heat control routine 306 that controls wash heater 68 and rinse heater 88. A fill control routine 308 ensures that adequate water levels are present within tanks 44, 66 and 86. Display routine 310 is responsible for providing an appropriate display on panel 276, and in particular, on alphanumeric display 280. Conveyor control routine 312, while not immediately responsible for starting and stopping of the conveyor (which is carried out by operator pushbutton switches 184 and 186), enables conveyor operation to occur whenever proper conditions exist. Motor error detect routine 314 checks to ensure that the various motors within the machine are properly operating. Finally, control routine 306 for repeating the main program loop.

At the same time that microprocessor 244 is executing the main program loop, a timer/sequencer routine 318 is being carried out. This routine monitors the various inputs to the microprocessor, controls various timed functions within the dishwashing machine, and sequences the various operations in the machine, a feature that is of key importance in the present invention.

Figure 11:
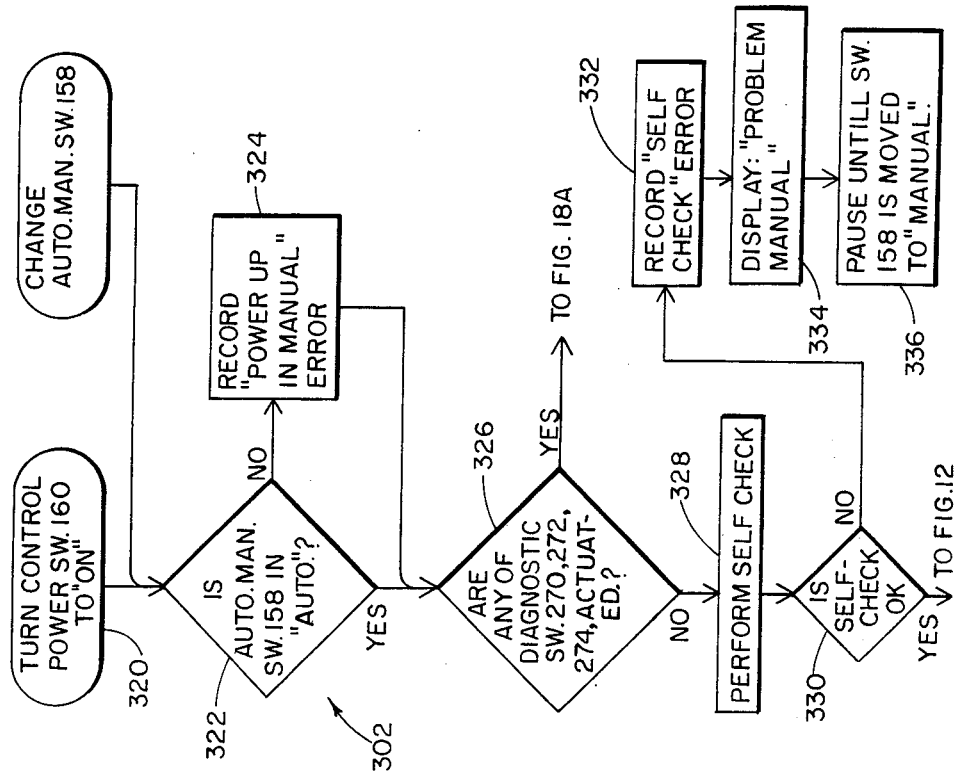
FIGS. 10–21D are all flow chart diagrams, each illustrating at least a portion of the operation of the dishwashing machine.

Reset routine 302 is shown in detail in FIG. 11. This routine is initiated either by movement of control power switch 160 to its "on" position or by movement of auto/manual switch 158 to either the "auto" or "manual" positions. Either of these actions is received by the microprocessor 244 through either control power input module 204 or auto/manual input module 218, as appropriate. These signals are received by timer/sequencer routine 318, which as will be described below, moves the main program to the reset routine 302.

Normally, the reset routine 302 is initiated by movement of power control switch 160 to its "on" position as indicated at 320. By checking the input from auto/-manual input module 218, the program determines at block 322 whether auto/manual switch 158 is in the "auto" position. If not, a "power up in manual" error is recorded as indicated at block 324. The program next determines at block 326 whether any of the diagnostic push/button switches 270, 272 or 274 are presently actuated. If so, the program moves to the diagnostic routine 304 which is shown in detail in FIGS. 18A-20B. If none of the switches are actuated, a self-check of the microprocessor memory and of display 280 is performed at block 328 in which microprocessor 244 surveys the memory, analog-to-digital coverter and timer, and lights all segments on display 280 for one second. In the event the self-check does not prove satisfactory, the program moves from block 330 to block 332, in which a self-check error is recorded in memory. Further, the message "Problem-Manual" is displayed as indicated in block 334, and as indicated in block 336, the program pauses until auto/manual switch 158 is moved to its "manual" position.

In the event the self-check proves satisfactory, the program moves from block 330 into the heat control routine 306 shown in detail in FIGS. 12A-12D. Initially, it is determined at block 337 whether float switches 72 and 92 are currently up. If so, a heat timer is reset at 5 seconds in block 338, its function being described below in connection with a later portion of route 306.

Next, prewash thermistor 254 is checked via subroutine 339 to be sure that it is functioning properly. The present value input from thermistor 252 is checked at block 340 to determine whether it is less than 11° F. If so, it is assumed that an open thermistor condition exists, and the memory is checked in block 341 to determine whether an open prewash thermistor error was detected during the preceding loop through the program. If not, such an error is recorded in memory at block 342. If the error has already been recorded, the error condition is simply continued, as shown at block 343. Next, at block 344, the program determines whether the thermistor value is less than 23° F. If so, the error condition is continued. This difference between initiating an error condition below 11° but continuing it below 23° is provided to avoid rapid cycling between error and non-error conditions if the thermistor value approaches 11°.

If the thermistor value is at or above 23°, any error condition which may still be present is cleared at block 345. Next, at block 346, the program determines whether the thermistor value exceeds 255° F. If so, it is assumed that a shorted prewash thermistor condition exists, and the program at block 348 determines whether such a condition was detected during the last loop to the program. If so, the error condition is continued at block 350 and, if not, the error is recorded in memory at block 352. Here an error condition is cleared at thermistor values below 222° F., as shown at block 351.

Next, the program begins subroutine 353 for controlling the wash heater 68. First a check of wash thermistor 254 is performed, as shown beginning at block 354. The steps are essentially identical to subroutine 339 performed for prewash termistor 252. In the event either an open or shorted error condition exists, the program determines at block 356 (FIG. 12D) whether wash heat output module 242 is currently actuated and, if so, deactuates the module at block 358.

If no wash thermistor errors are present, the heat timer is checked at block 359 to see whether it has timed out. Since the timer is repeatedly reset at blocks 337 and 338 as long as floats 72 and 92 are down, it can only time out if float 72 or 92 has been up for 5 seconds. This will prevent chatter of the wash heat contactor when the water level is near that of the float.

The program next determines at block 360 whether wash heat output module 242 is currently actuated. If heat is not presently being applied, the program determines at block 362 whether the pumps output module 236 is currently actuated. If not, the value of wash thermistor 256 is checked at block 364 to determine whether it is less than a predetermined setpoint temperature for wash tank 56. If not, the program continues on, but if the temperature is below the setpoint, the wash heat output module 242 is actuated in block 366.

It has been found that during times in the dishwasher cycle in which the pumps, such as wash pump 64, do not operate, corresponding components such as supply conduit 62 and wash manifolds 58 and 60 will cool. In addition, the air within wash chamber 56 will cool, and since the ware within the chamber has not previously been sprayed, it will also be at a lowered temperature. Thus, when pumping is first initiated, the water that passes through the supply conduit and manifolds and enters the air within the chamber and strikes the ware will be cooler than the temperature of the water within tank 66. This is a particularly significant problem in wash chamber 56 and rinse chamber 76 where proper temperature is necessary to ensure thorough cleaning of the ware. Accordingly, the dishwasher of the present invention is designed so that during times in which the pumps are idle, heaters 68 and 88 within wash tank 66 and rinse tank 86, respectively, maintain the water therein at a higher temperature than during periods in which the pumps are operating. This heat offset is controlled by microprocessor 244 as part of heat control routine 306. Referring back to FIG. 12, if the program determines in block 362 that the pumps output module 236 is not actuated, the program checks the value of thermistor 254 at block 368 to determine whether it is less than the setpoint plus 10° F. Thus, actuation of the wash heat output module 242 in block 366 is carried out to ensure that water temperature within tank 66 is maintained 10° higher than the predetermined setpoint during times in which the pumps are not operating.

If, at block 360, the program determines that the wash heat is not presently on, a determination is made in block 370 as to whether pumps output module 236 is presently actuated. Depending upon the status of module 236, the program determines at either block 372 or block 374 whether the wash thermistor value is less than the setpoint temperature plus 4° or 14°, respectively. If the thermistor value is less than these temperatures, actuation of wash heat module 242 continues, but if not, module 242 is deactuated in block 358.

It will be noted that deactuation temperatures exceed the actuation temperatures by 4° both in cases in which pumps are operating and are not operating. This difference is provided so that in the event temperature within tank 66 is at or near the setpoint (or the setpoint plus 10°), the wash heat output module 242 will not be repetitively and rapidly turned on and off.

At block 376, the program performs a series of steps relating to rinse thermistor 256 that is identical to those performed with regard to wash thermistor 254 in subroutine 353. Initially, the thermistor 256 is checked for an open or shorted condition, after which the program surveys temperature within rinse tank 86 and actuates rinse heat output module 170, deactuates module 170, or takes no action, as appropriate. Finally, beginning at block 378, the final rinse thermistor 258 is checked for an open or shorted condition using the steps of subroutine 339. Following these steps, heat control routine 306 is completed Additional controls are provided for wash heater 68 and rinse heater 88 that are hardware dependent and carried out outside the microprocessor 244. Referring to FIG. 6B, wash heat output module 242 provides current to the coil of contactor 4CON through contacts associated with control relay 2CR and high limit thermostat 194. Similarly, rinse heat output module 170 provides current to contactor 2CON through an additional contact pair of relays 2CR. The coil of relay 2CR is located in series with wash float 72 and rinse float 92 which, as can be seen from FIG. 1, are positioned to ensure that sufficient water is present in tanks 66 and 86 to cover heaters 68 and 88. Thus, if the water level of either tank is too low, either float switch 72 or 92 will open, deenergizing the coil of relay 2CR. This will open the contacts located in series with controller coil 4CON, thereby preventing energization of wash heater 68 despite actuation of output module 242.

Figure 13A:
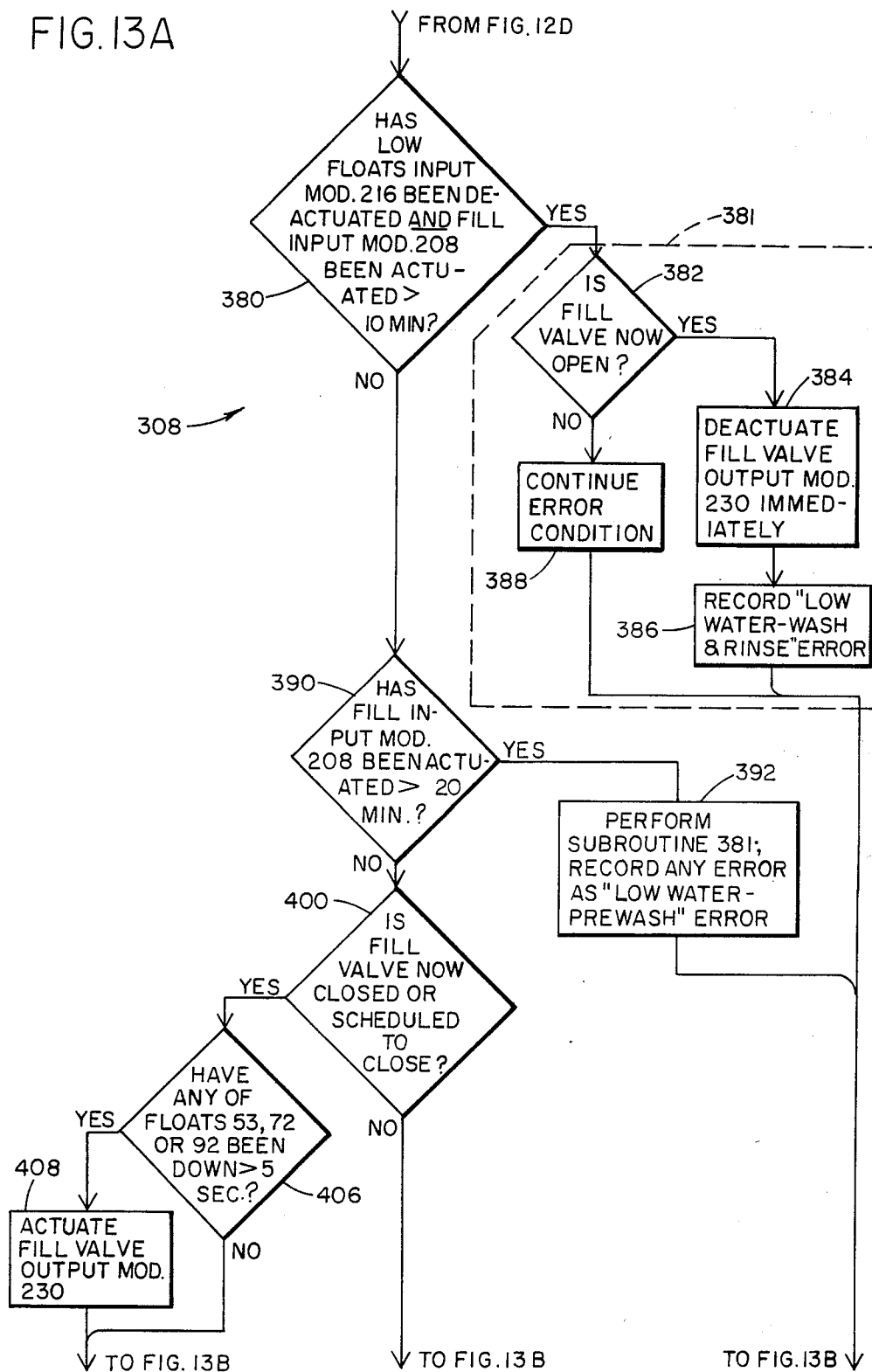
Figure 13B:
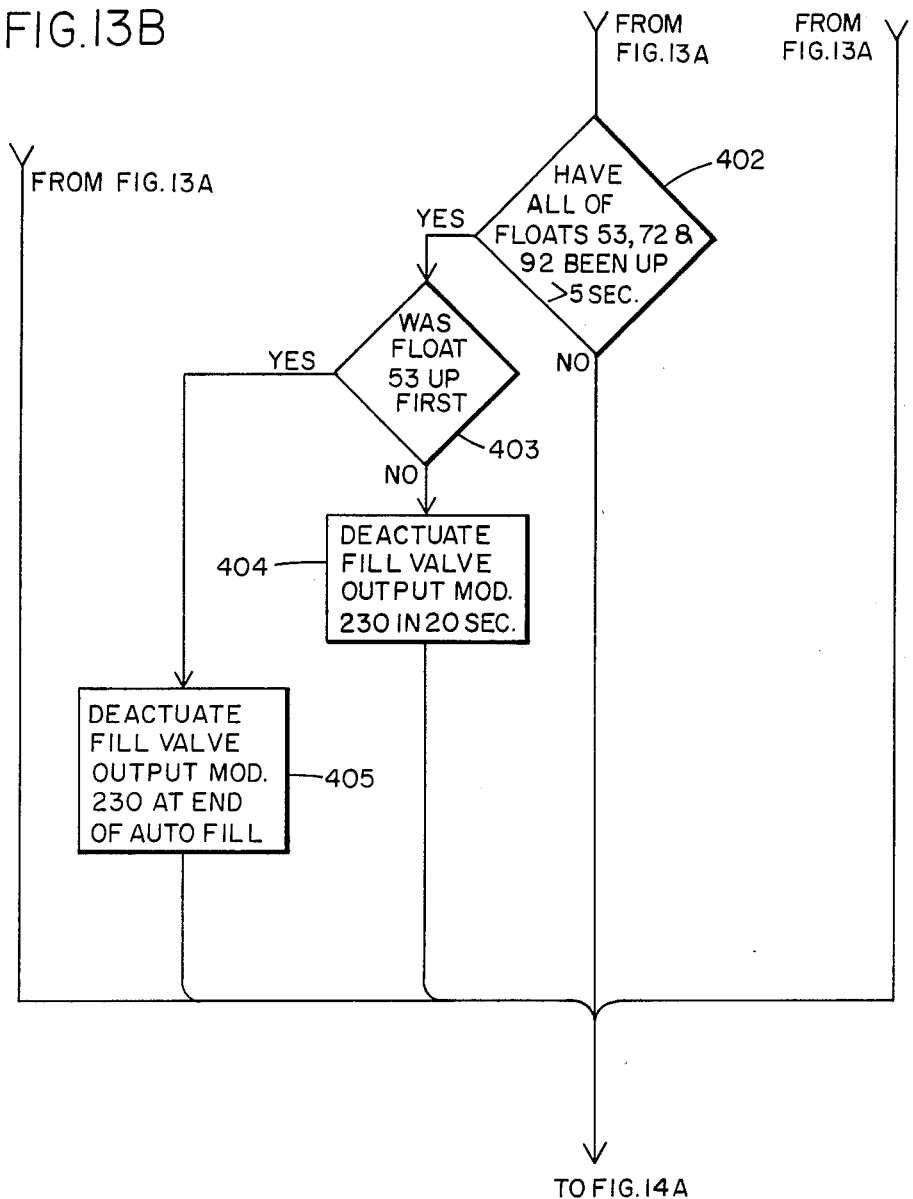
Figure 14A:
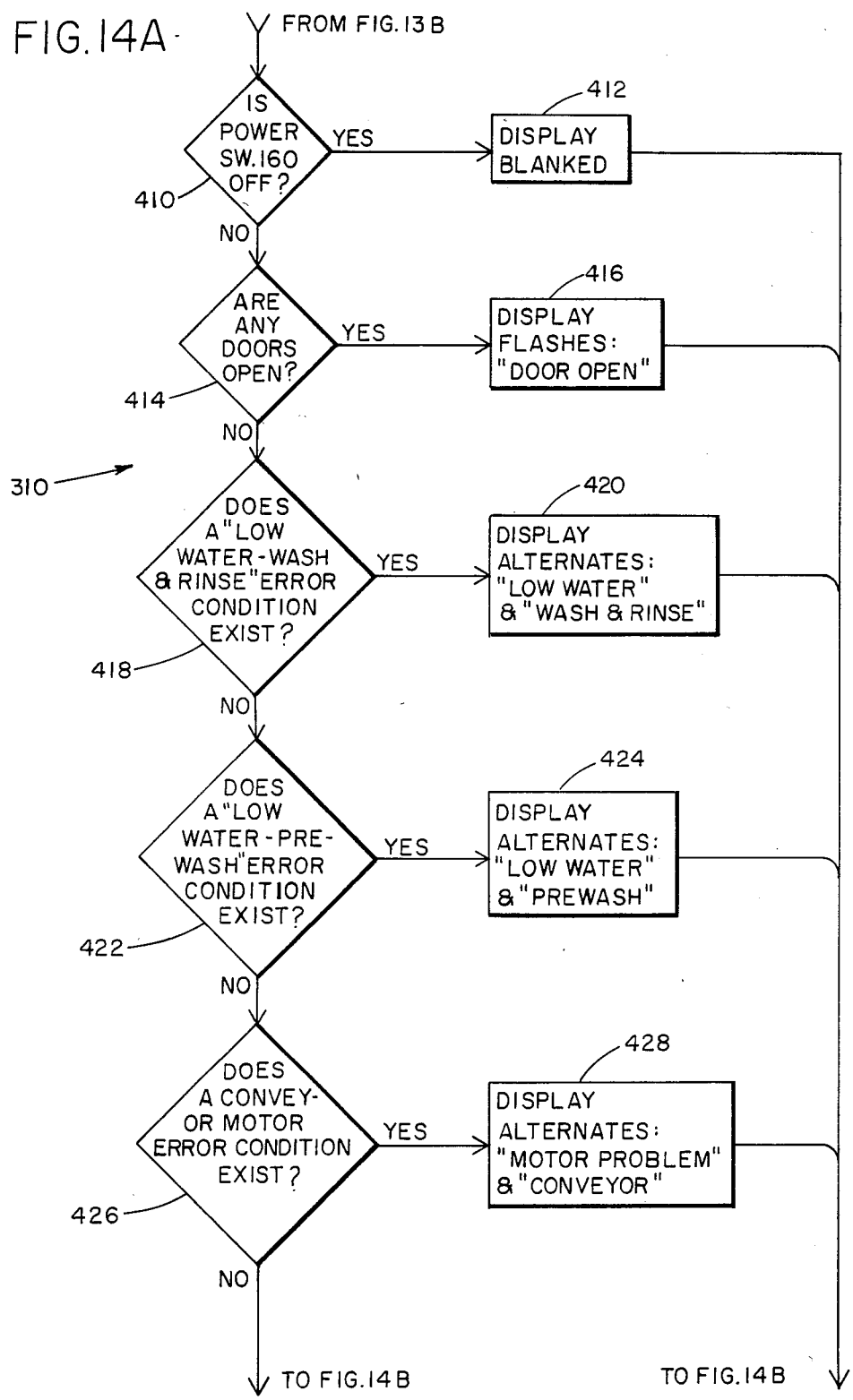
Figure 14C:
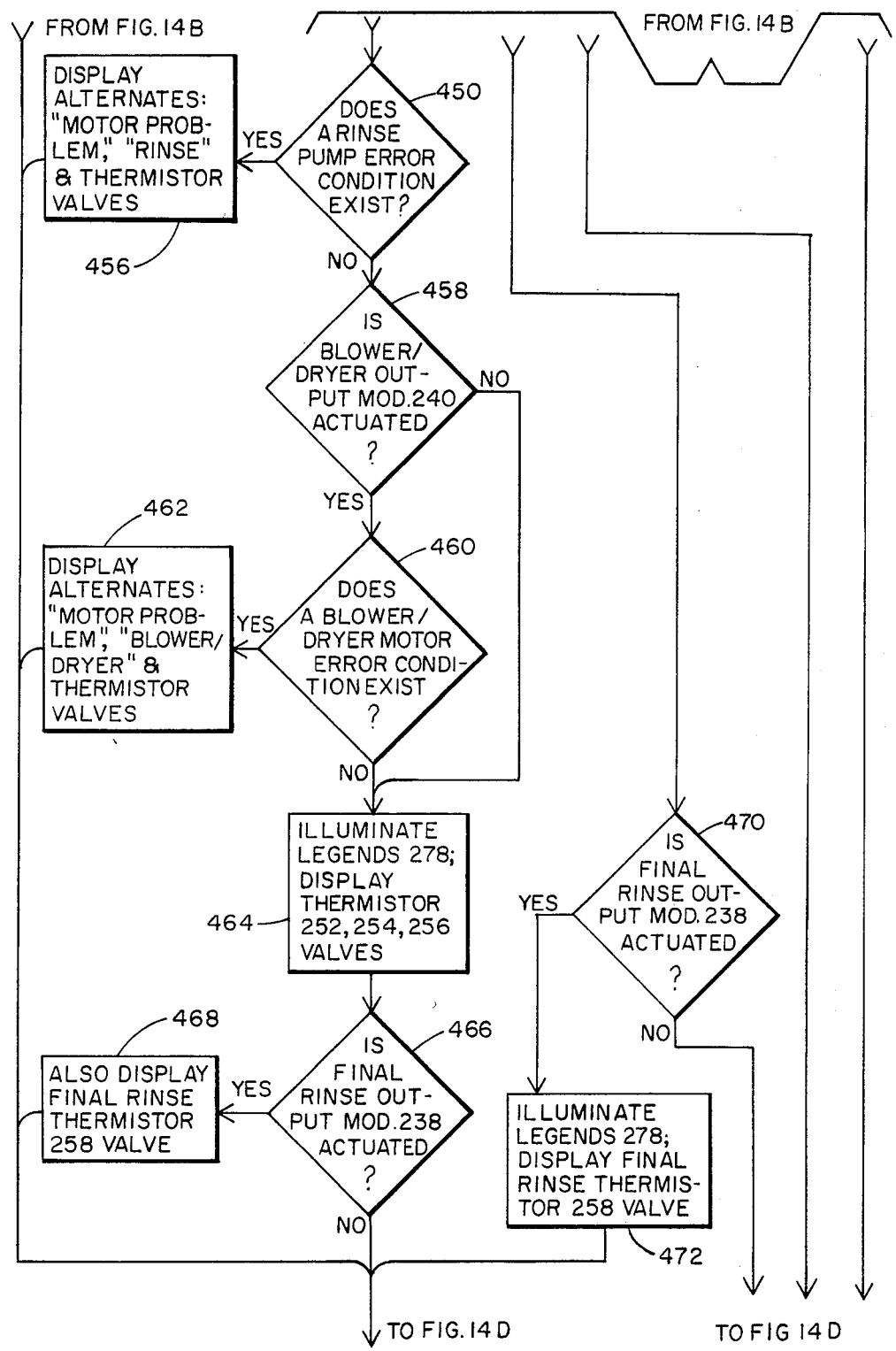
Figure 14D:
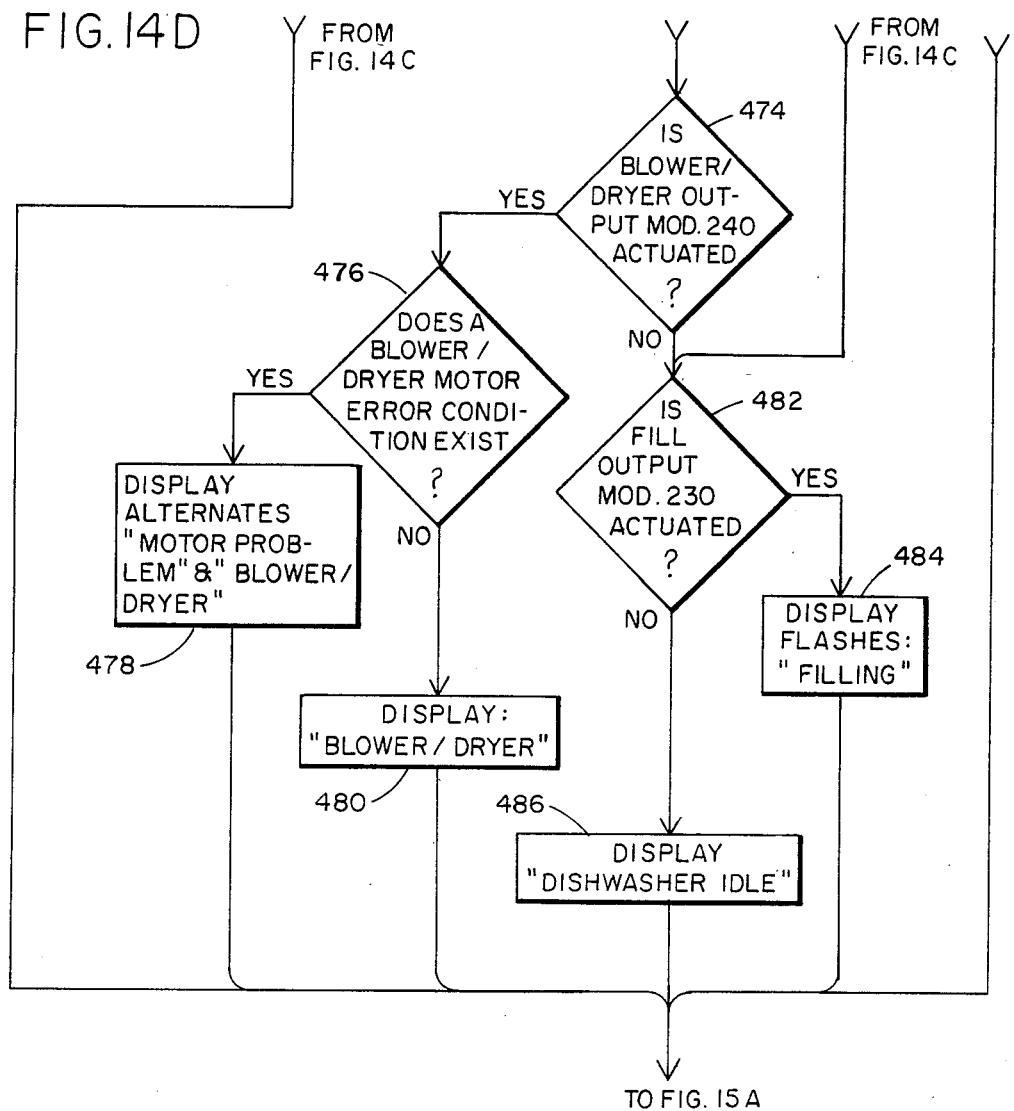

After completing heat control routine 306, the program moves to fill control routine 308 shown in FIG. 13A and 13B. Initially upon entering fill routine 308, the program determines whether fill solenoid 178 has been actuated for a period longer than that required to fill tanks 44, 66, and 86. Typical times for filling these tanks, depending upon local water pressure, are in the order of five minutes, so that energization of solenoid 178 for a longer period will likely be indicative of a drain plug that has been inadvertently removed or the like. It should be noted that under normal operating conditions, wash float 72 and rinse float 92 will be closed, so that the low floats input module 216 should normally be actuated. Fill input module 208, on the other hand, is normally deactuated since upper prewash float 53 is open when prewash tank 44 is properly filled. Additionally, when wash float 72 and rinse float 92 are closed, thereby energizing the coil of control relay 2CR, normally closed contacts 2CR shown near float switch 53 in FIG. 6A will be open so that input module 208 is deactuated during a full condition.

Accordingly, the program determines at block 380 whether low floats input module 216 has been deactuated and fill input module 208 has been actuated for greater than a continuous ten-minute period. Such a condition will occur when the floats 72 and 92 fail to be closed by filling of the dishwashing machine. In such a case, the program performs subroutine 381 beginning at block 382, where it checks the status of fill output module 230 to determine whether fill valve solenoid 178 is currently actuated. If this is the case, the fill valve output module 230 is immediately deactuated at block 384 and a "low water-wash and rinse" error is recorded in memory at block 386. If the fill valve is not presently open, the error condition is continued at block 388.

If an error condition in block 380 is not indicated, the program next determines at block 390 whether fill input module 208 has been actuated for a period exceeding 20 minutes. Such a condition may occur where tanks 66 and 86 have been filled, but prewash tank 44 has failed to fill properly. This may occur such as where a drain plug has been removed from tank 44 or where standpipes 70 or 90 have become blocked. If such a condition is detected, the program performs subroutine 381 at block 392. The fill output module 230 is deactuated if the value is open and a "low water-prewash" error is recorded. If the valve is closed, the error condition is continued.

In the event a "low water" error condition exists, it can be recovered from by turning control power switch to "off" and back to "on", or by moving auto/manual switch 158 to "manual" and back to "auto". In either case, such action moves the main program back to reset routine 302, thereby resetting the timer so that filling can continue. As an alternative, any door on the dishwashing machine can be opened, thereby opening one of door switches 172, 174, or 176, and deactuating doors input module 206 (see FIG. 6A). This deactuation resets the 10 minute or 20 minute timer within microprocessor 244, and the error conditions will no longer be satisfied.

If no error condition has been detected, the program next determines at block 400 whether the fill valve is currently closed or currently scheduled to be closed. If not, the program next determines at block 402 whether floats 72 and 92 and float 53 have all been in their uppermost position for greater than 5 seconds. If so, the program determines at block 403 whether float 53 was the first float up. If not, the fill valve output module 230 is scheduled at block 404 to be deactuated in 20 seconds. This slight overfill is provided to account for water within the tanks that is moved into the supply conduits and spray manifolds upon starting of the pumps. If the float 53 is up first, it is indicative of low water levels in tanks 66 and 86, such as will occur in the event these tanks alone are drained. In such a case, a timed fill occurs at block 405, the duration of this autofill being selectable as part of diagnostics routine 304, as will be described.

The requirement that the floats be up continuously for a greater than 5 second period is to prevent repetitive actuation and deactuation signals from being generated by microprocessor 244 as the water level within the dishwasher tanks approach the full condition.

In the event that the program determines at block 400 that the fill valve is now closed or is scheduled to be closed, the program checks at block 406 to determine whether any of floats 53, 72 or 92 have been in their down positions for greater than 5 seconds. If so, the fill valve output module is actuated at block 408. If not, the program moves to display routine 310, which is shown in detail in FIGS. 14A–14D.

Display routine 310 controls the display panel 276 in accordance with a priority of various display indications depending upon conditions within the dishwashing machine. Initially, at block 410, the program determines whether power switch 160 is in its "off" position. If so, the display is blanked as indicated at block 412. If power switch 160 is not off, the program next surveys doors input module 206 at block 414 to determine whether any doors are presently open. If so, the display provides at block 416 a flashing display of "DOOR OPEN".

If neither of these conditions exists, a "low water-wash and rinse" error condition is checked for at block 418. In the event such an error exists, the display, as shown at block 420, alternates between "LOW WATER" and "WASH and RINSE". Next, a "low water prewash" error condition is checked for at block 422 and, if found, a display is provided at block 424 that alternates between "LOW WATER" and "PREWASH".

If none of the foregoing conditions exist, the program checks at block 426 for a conveyor motor error condition, which is determined as will be described below, and if such a condition exists, provides a display at block 428 that alternates between "MOTOR PROBLEM" and "CONVEYOR". If a conveyor jam error condition exists at block 430, then the display provides at block 432 for alternating indications of "PROBLEM" and "CONVEYOR JAMMED". If a dish jam error condition exists at block 434, the display flashes at block 436 the message "UNLOAD CONVEYOR".

Next, auto/manual input module 218 is checked to determine whether switch 158 is in its "manual" position, as indicated at block 438. If so, the program checks at block 440 to determine whether conveyor on input module 214 is actuated, indicating that conveyor drive motor 26 is presently energized. If this is the case, indicators 278 on display panel 276 are illuminated, and as indicated at block 442, display 280 provides the prewash, wash, rinse and final rinse values of thermistors 252, 254, 256 and 258.

If auto/manual switch is in the "auto" position, the program determines at block 444 whether pumps output module 236 is currently actuated. If so, checks are made at blocks 446, 448 and 450 for error conditions in the pump motors of prewash pump 46, wash pump 64, and rinse pump 84, respectively. If any of these conditions exists, the display provides at blocks 452, 454, and 456 for a display alternating between "MOTOR PROBLEM", the appropriate indication in the priority order of "PREWASH", "WASH" or "RINSE", and a display of the values of thermistors 252, 254, 256 and 258.

If blower/dryer output module 240 is actuated, as determined at block 458, a check is made at block 460 for the existence of a blower motor error condition. If such a condition exists, the display provides at block 462 for alternation between "MOTOR PROBLEM", "BLOWER/DRYER", and the thermistor values.

If none of the foregoing motor problems exists, but pumps output module 236 is actuated, indicators 278 of display panel 276 are illuminated and display 280 provides indication of the prewash, wash and rinse thermistor values, as indicated at block 464. If final rinse output module 238 is also actuated, determined at block 466, then display 280 also provides the final rinse thermistor value at 468.

In the event pumps output module 236 is not actuated, as was determined at block 444, but final rinse output module 238 is actuated at block 470, then at block 472, indicators 278 are illuminated and only the final rinse thermistor value is displayed.

If neither pumps output module 236 nor final rinse output module 238 are actuated, but blower/dryer output module 240 is actuated as determined at block 474, the program determines at block 476 whether a blower/dryer motor error exists. If so, the display alternates at block 478 between "MOTOR PROBLEM" and "BLOWER/DRYER". If not, the display indicates "BLOWER/DRYER" at block 480.

If none of the foregoing conditions exists, then the program determines at block 482 whether fill output module 230 is currently actuated. If so, a flashing display is provided at 484 with the indication "FILLING". If no filling is occurring, however, the display provides at block 486 for the indication "DISHWASHER IDLE". Having completed the display routine 310, the program next moves to the conveyor control routine 312 shown in detail in FIGS. 15A and 15B.

Referring briefly back to FIG. 6A, it will be noted that conveyor motor 26 is directly controlled by contactor coil 6CON. Because power is supplied to this coil from conveyor enable output module 234 through the normally open contacts of control relay 5CR, this relay is required to be actuated for conveyor motor 26 to be energized. The coil for relay 5CR is located in a separate circuit that includes start and stop pushbutton switches 184 and 186 and provides a latch for the conveyor motor that is enabled through conveyor latch enable output module 232. Thus, both modules 232 and 234 must be actuated before the conveyor motor can be energized. However, starting and stopping of the conveyor motor is directly controlled by the operator through switches 184 and 186, which latch and delatch control relay 5CR.

The conveyor latch enable output module 232 is normally actuated continuously whenever power switch 160 is in its "on" position. However, power is supplied to module 232 through door switches 172, 174 and 176. Thus, in the event a door is opened, power is interrupted to module 232, thereby interrupting power to the coil of control relay 5CR. The relay is then delatched. When the door is subsequently closed, it is necessary for the operator to again push one of start switches 184 before the conveyor will resume movement.

Figure 15A:
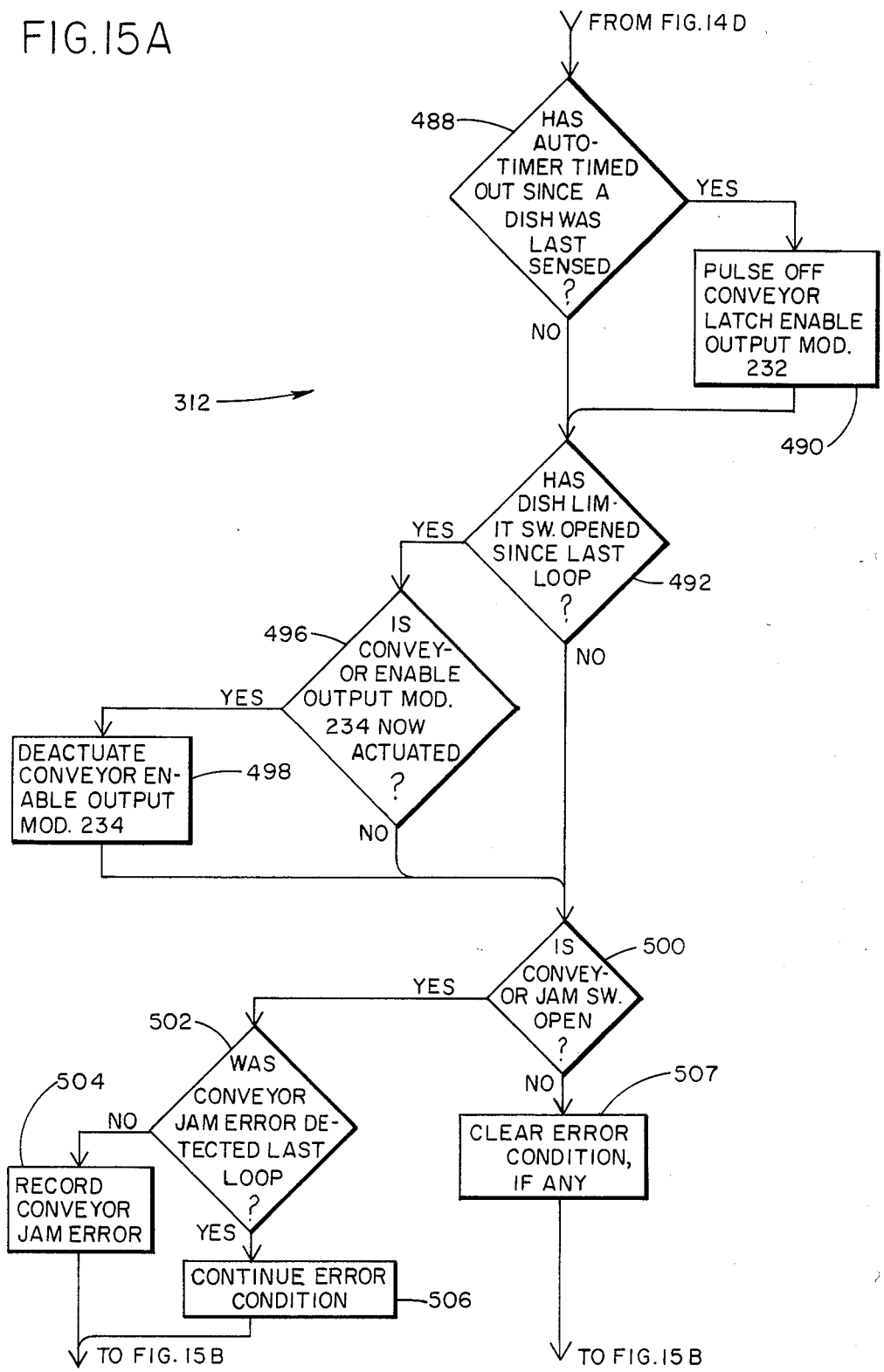
Figure 15B:
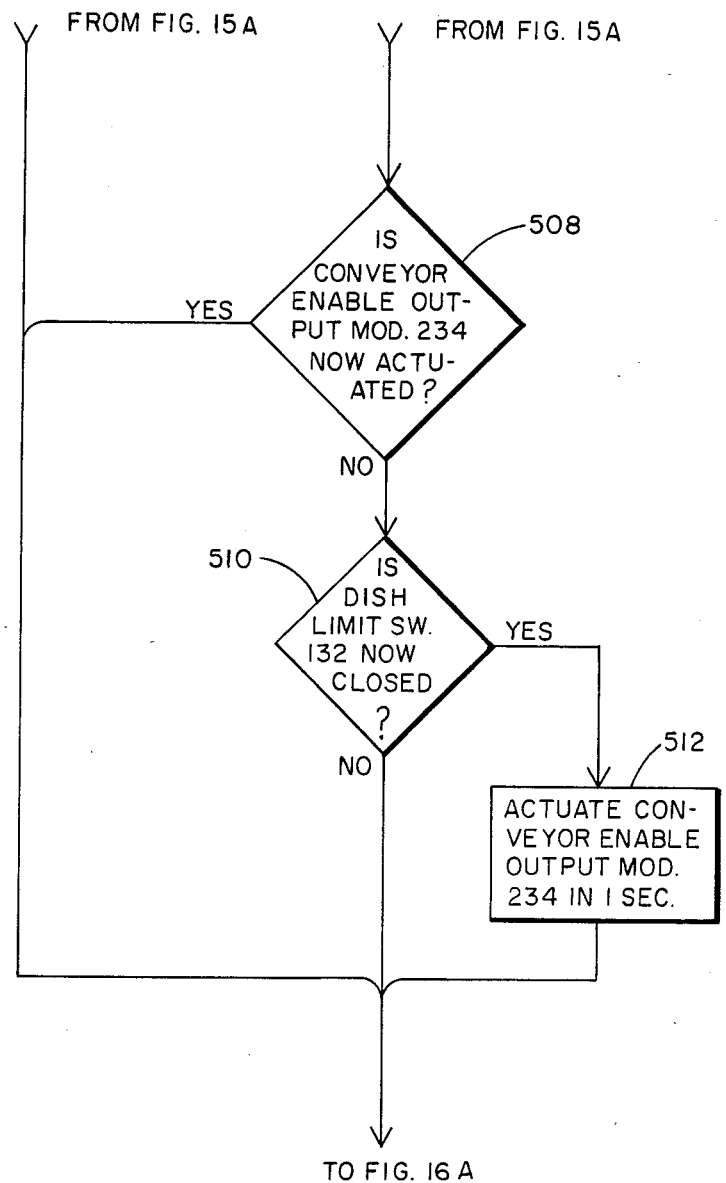

Referring now to conveyor control module 312 in FIGS. 15A and 15B, the program determines at block 488 whether an auto-timer has timed out since a dish was last sensed by dish sensor 124. The auto-timer is an internal clock within microprocessor 244 that begins to run each time a dish is sensed by sensor 124. With each subsequent dish, the timer is reset, so that the timer will fully time out only when a ware item is placed into the machine and not followed by another within the time value set for the auto-timer, typically in the order of 5–10 minutes. In the event the timer does fully time out, the conveyor latch enable output module 232 is pulsed off at block 490, thereby halting conveyor movement until a start switch 184 is depressed. This prevents the conveyor from moving needlessly when no ware has been placed into the machine.

The program next determines at block 492 whether dish limit switch 132 has opened since the last loop through the program. In the event this occurs, it indicates that a ware item has moved completely to the opposite end of the conveyor. After determining at block 496 whether conveyor enable output module 234 is currently actuated, module 234 is completed deactuated at block 498, thereby halting the conveyor.

If dish limit switch 132 is either closed or has been continuously open, the program checks at block 500 to determine whether conveyor jam switch 182 is now open. If so, the program determines at block 502 whether a conveyor jam error was detected during the last loop through the program, and if not, a conveyor jam error is recorded at block 504 and the conveyor latch relay 5CR is deenergerized (FIG. 6A). If the error existed during the last loop, the error condition is continued at block 506, and any error condition no longer in effect is cleared at block 507.

If a conveyor jam error is not present, the program checks at block 508 whether conveyor enable output module 238 is presently actuated. If so, the program moves on to the motor error detect routine 314. It not, an inquiry is made at block 510 as to whether dish limit switch 132 is presently closed. If not, the program continues on, thereby preventing energization of the conveyor until the ware item holding switch 132 open is removed. If switch 132 is now closed, the conveyor enable output module 234 is actuated in one second, as indicated at block 512. The delay is provided to prevent chatter of the conveyor contactor coil 6CON in the event the latch circuit for the conveyor is currently energized.

Figure 16A:
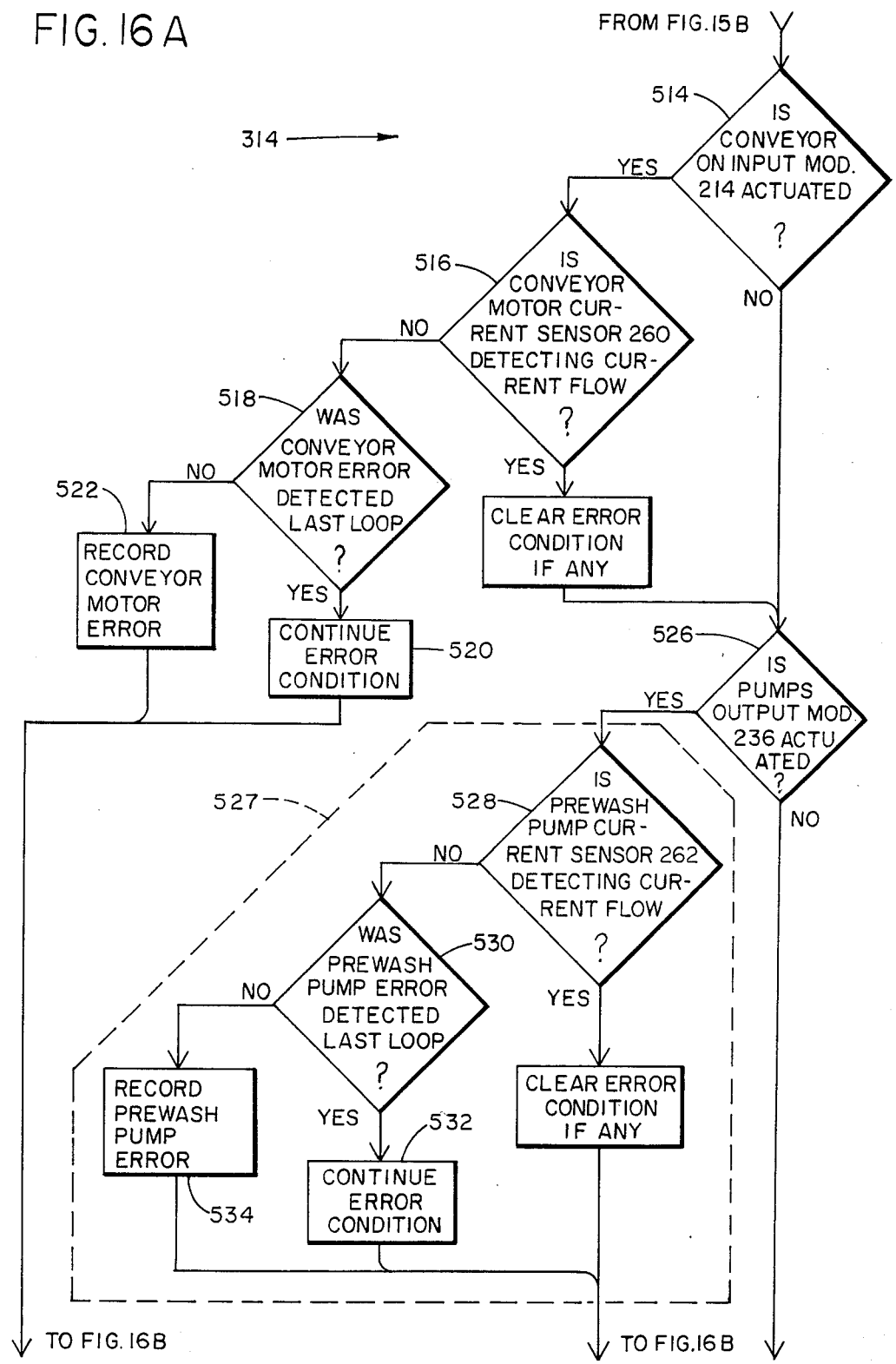
Figure 16B:
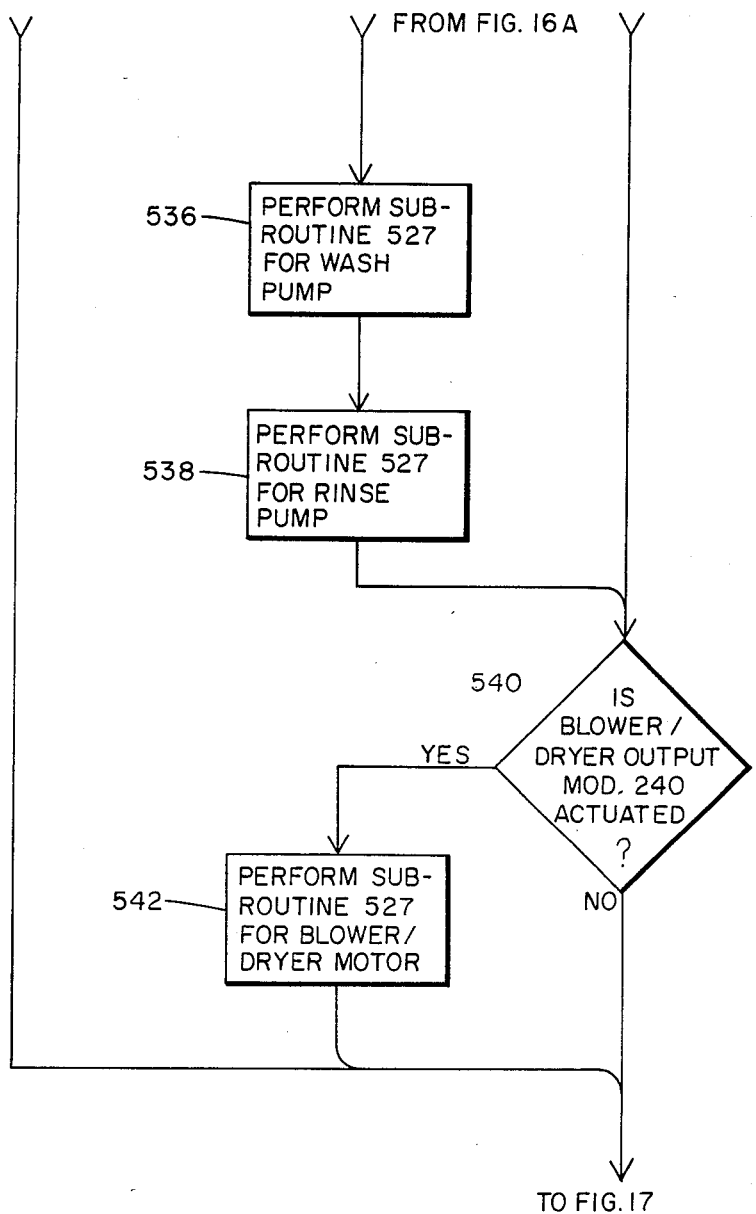

The program next moves to motor error detect routine 314 shown in detail in FIGS. 16A and 16B. Initially, the program determines at block 514 whether conveyor on input module 214 is actuated, indicating that conveyor motor 26 should be operating. If module 214 is actuated, the program checks at block 516 to determine whether conveyor motor current sensor 260 is detecting current flow. If not, this indicates that the thermal protection switch within motor 26 has tripped or the motor is malfunctioning for some other reason. In block 518, it is determined whether a conveyor motor error was detected during the last loop of the program, and if so, the error condition is continued at block 520. If the error has not been previously detected, the error is recorded at block 522. Since, as seen in FIGS. 6A and 6B, pumps output module 236 and blower/dryer output module 240 both receive power input through contacts associated with control relay 3CR, and since this relay is connected in parallel with the coil of contactor 6CON, deactuation of module 234 precludes any power application to the pumps or blower/dryer motor, and the program can move directly out of routine 314.

If the conveyor motor 26 is operating properly, the program next determines at block 526 whether pumps output module 236 is actuated. If so, subroutine 527 is begin in which prewash pump current sensor 262 is checked at block 528 to determine whether current is flowing through the motor of prewash pump 46. If not, it is determined at block 530 whether a prewash pump error was detected during the last program loop, and if so, the error condition is continued at block 532. If not, the prewash pump error is recorded at block 534. However, despite the error, dishwasher operation continues.

A similar check of wash pump 64 through subroutine 527 is performed at block 536, as well as a check of rinse pump 84 at block 538. Next, the program determines at block 540 whether blower/dryer output module 240 is actuated. If so, a check of blower motor 116 using subroutine 527 is performed at block 542.

Figure 17:
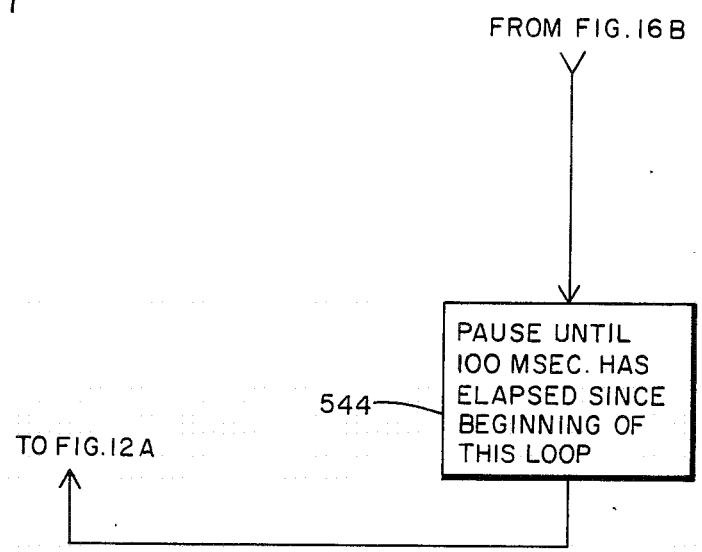

The program next moves to return routine 316 shown in detail in FIG. 17. This routine consists simply of pausing the program at block 544 until 100 milliseconds have elapsed from the beginning of the current program loop. Following this period, the program is returned to the heat control routine 306 (FIGS. 12A–12D) to begin another loop.

Diagnostic routine 304 can be seen in detail by reference to FIGS. 18A–20B. This routine is entered directly from the reset routine at block 326 in FIG. 11. Initiation of routine 304 is specifically caused in response to actuating one of the three diagnostic push/button switches, 270, 272 and 274 simultaneously with movement of control power switch 160 to the "on" position. Actuation of the switches is not a normal part of machine operation, and it is intended that these switches will normally be actuated by service personnel rather than the machine operator.

Figure 18A:
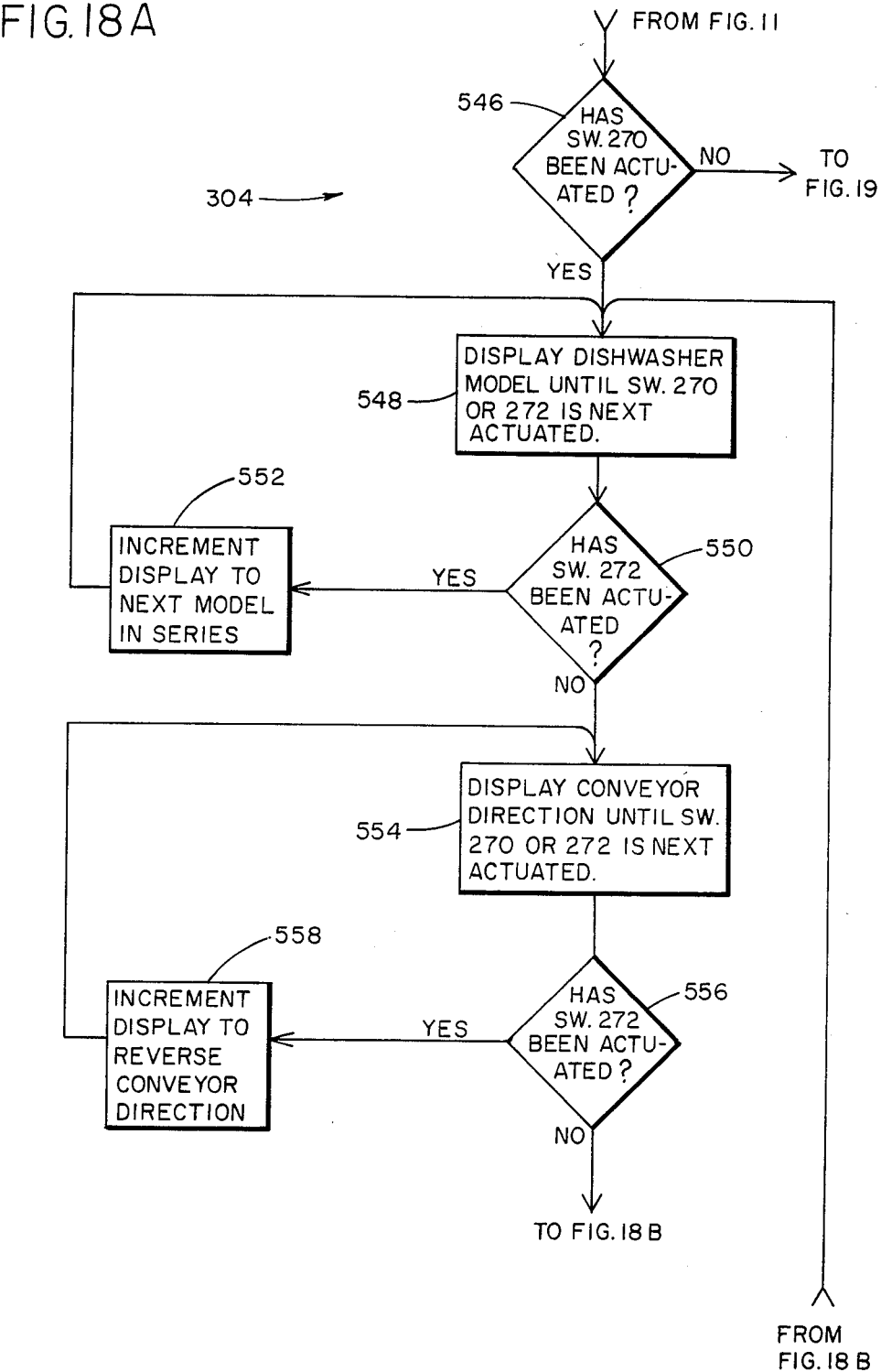

As seen in FIG. 18A, routine 304 initially determines at block 546 whether switch 270 has been actuated. If not, the program moves to that portion of the routine shown in FIG. 19. If switch 270 has been actuated, display 280 continuously indicates the dishwasher model until either switch 270 or 272 is subsequently actuated, as shown at block 548. The particular dishwasher model depends upon whether the dishwashing machine is desiged to sanitize ware through relatively high-temperature heated rinse water, or through addition of a chemical sanitizing agent. As a third alternative, the dishwashing machine may be adapted to wash items other than dishware, such as machine parts or the like, in which case operational temperature requirements may be quite different. Examples of display indications to indicate the dishwasher model may include "H" for high-temperature rinse water, "L" for relatively low-temperature rinse water, and "S" for special dishwsher versions.

Once either of switches 270 or 272 are actuated, the program determines at block 550 which of these switches has been depressed. If switch 272 has been actuated, the display is incremented to the next dishwasher model in the series at block 552. Once the series has been completed, an additional actuation of switch 272 will bring the display back to the first element of the series.

In the event switch 270 is actuated, the program moves to block 554 where the conveyor direction is displayed until either switch 270 or 272 is next actuated.

Depending upon particular details of the installation site, the dishwashing machine may be constructed for conveyor movement from left to right or right to left as seen from the operator side of the machine. To avoid having to provide two types of control systems, microprocessor 244 is programmed so as to be selectable for either direction of operation. Actuation of switch 272 in response to this display, as determined at block 556, increments the display for controlling operation in a reversed conveyor direction at block 558.

Should switch 270 be actuated in response to display of conveyor direction in program begins subroutine 559 and the display next indicates whether the microprocessor 244 is currently programmed to display temperatures in Fahrenheit or Celsius, shown at block 560. In the event switch 272 is actuated in response to this display, as determined at block 562, the display is incremented at block 564 to change the temperature format.

Actuation of switch 270 causes the program to perform subroutine 559 at block 566 to set the value for the auto-timer in whole minute intervals. (Operation of the auto-timer has been described in connection with FIGS. 15A and 15B above.) Actuation of switch 272 causes the auto-timer value to be incremented to the next whole minute value in the available range, and in the event the display is currently at the maximum value, actuation of switch 272 increments the display to the lowest value in the available range.

In the event switch 270 is actuated while the display is indicating the auto-timer set value, the display will change by performing subroutine 559 as indicated at block 572 to display the wash heat setpoint value. Actuation of switch 272 will, in a manner identical to that described for the auto-timer value, increment the display to the next whole degree value in the available range. Actuation of switch 270 causes the rinse heat setpoint value to be displayed at block 574. Switch 272 can then be used to increment the set point value to the next whole degree in the available range.

Actuation of switch 270 causes the program to perform subroutine 559 at block 575 to display and change the mode of operation for the blower/dryer station within the machine. While operation is described such that blower/dryer motor 116 is operated in sequenced fashion, as will be discussed below. However, the blower/dryer motor 116 can alternatively be operated whenever conveyor motor 26 is operating, or the entire blower/dryer station can optionally be eliinated when the dishwashing machine is built. Actuation of switch 272 changes the mode of operation to conform to these situations, thereby modifying slightly the operation of microprocessor 244.

At block 577, the program performs subroutine 559 to enable the set value for the autofill timer, discussed in connection with FIGS. 13A and 13B above, to be changed.

Figure 18B:
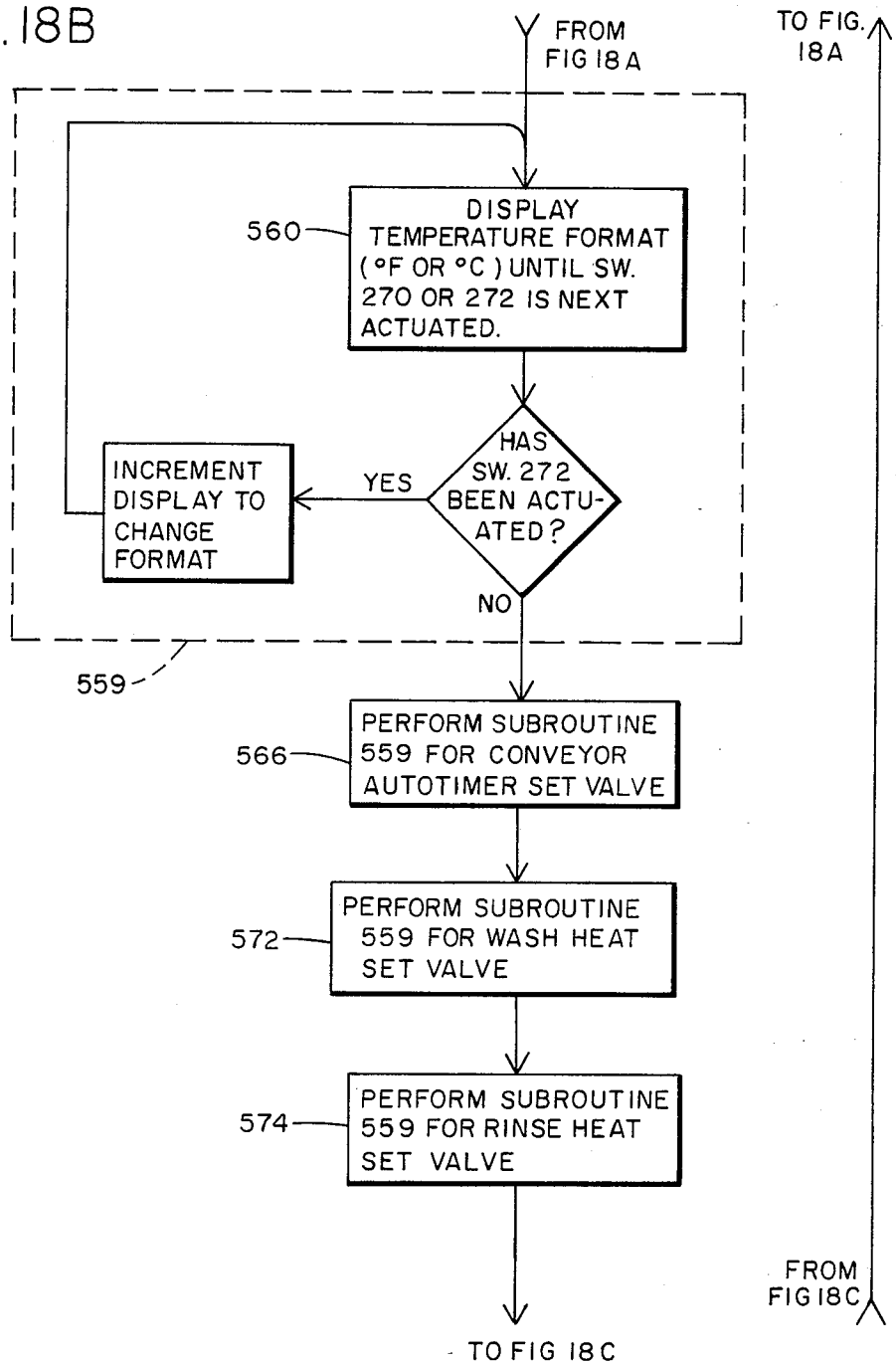
Figure 18:
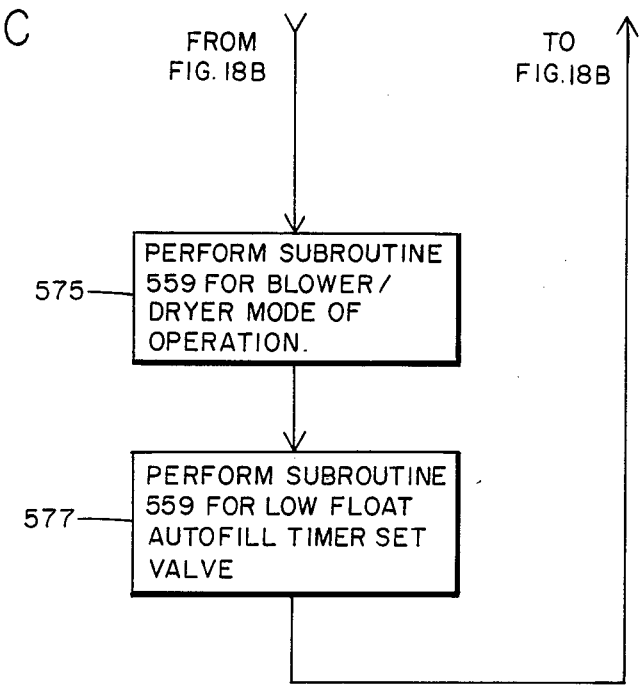

Further, actuation of switch 270 will cause the program to loop back to block 548, in which the dishwasher model is displayed. The program loop shown in FIGS. 18A-18C can be escaped only by causing the program to return to reset routine 302, such as by moving switch 160 to the "off" position and returning it to the "on" position.

Figure 19:
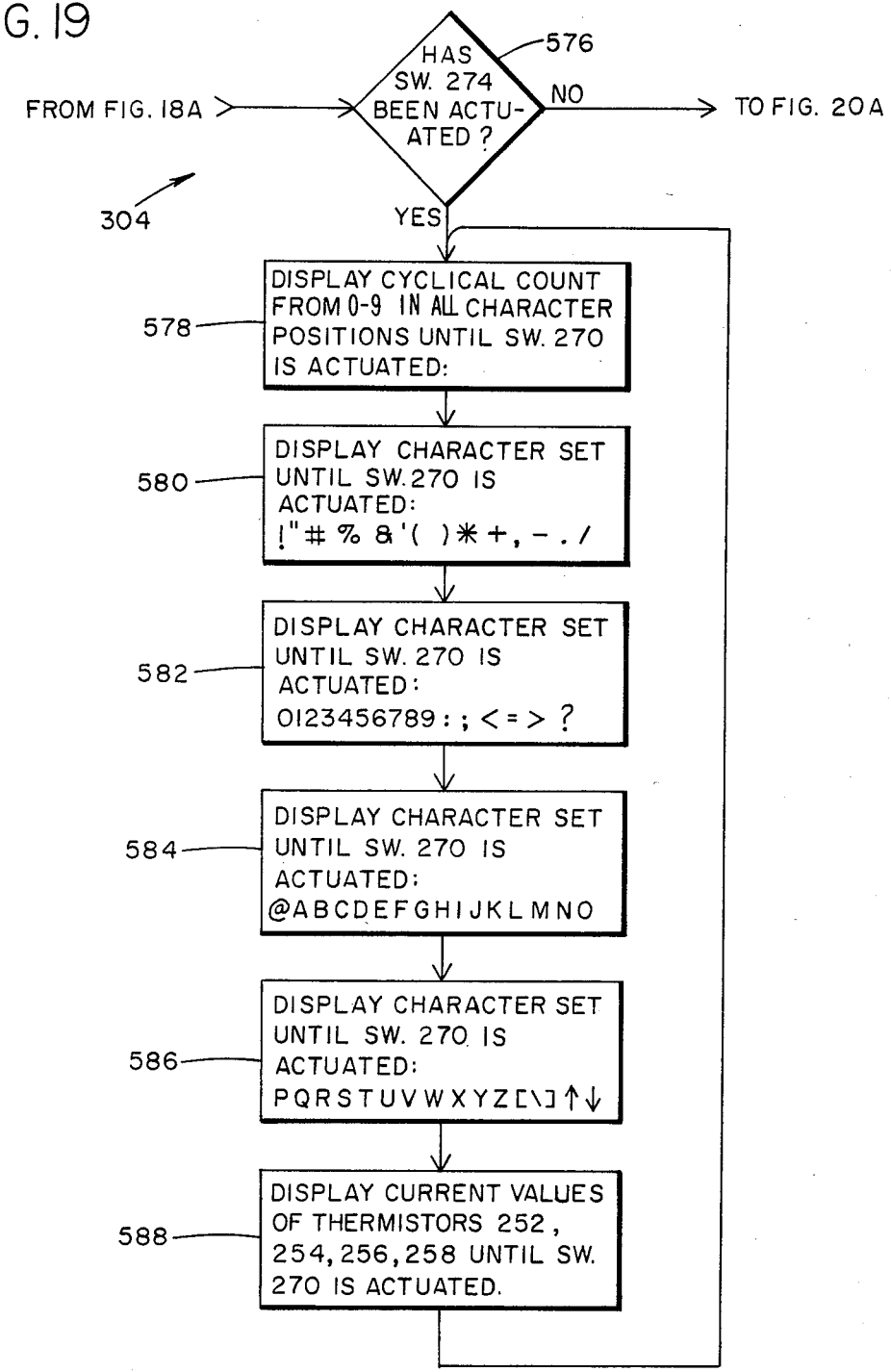

In the event the program has entered the diagnostics routine 304 in response to actuation of switch 274, the program carries out the steps shown in detail in FIG. 19. After it has been determined that switch 274 has been actuated, carried out at block 576, the display proceeds at block 578 to cyclically count from "0" to "9" in all character positions, the count being incremented at one second intervals, until switch 270 is next actuated. Actuation of this switch next causes the display to statically provide the character set indicated in block 580, with subsequent actuations of switch 270 causing display of the character sets shown in blocks 582, 584, and 586. A further actuation of switch 270 displays, at block 588, the current values of thermistors 252, 254, 256 and 258. A further actuation of switch 270 returns the program to block 578.

Figure 20A:
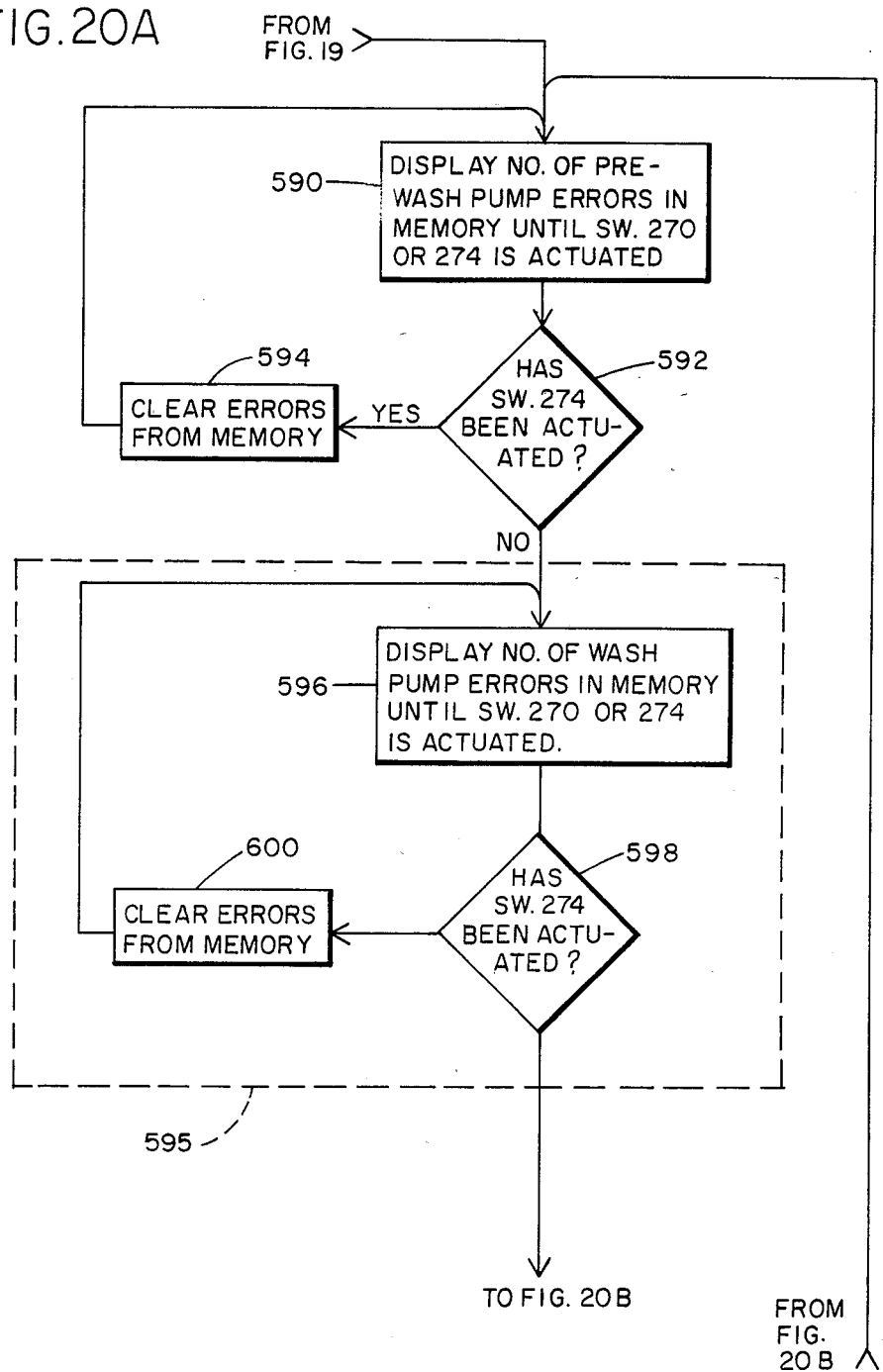

If diagnostics routine 304 is entered by actuation of switch 272, the program proceeds through the steps illustrated in FIGS. 20A and 20B. Initially, at block 590, the display indicates the number of prewash pump errors recorded in memory. This display continues until either of switches 270 or 274 is actuated, and includes a two digit numeral indicating the number of such errors stored (up to a maximum of 99), followed by an indication of the type of errors being displayed. This latter designation can be a series of abbreviations, codes, or some other indication, up to a maximum of 14 characters so as to be able to be presented on display 280.

If switch 274 is next actuated, as determined at block 592, the stored number of prewash pump errors are cleared from memory at block 594, resulting in the display now indicating a total of zero recorded errors.

Upon actuation of switch 270, the program enters subroutine 595 and the display indicates at block 596 the number of wash pump errors stored in memory in a manner similar to that used in displaying the number of prewash pump errors. Again, by actuation of switch 274 as indicated at block 598, the stored number of errors can be cleared from memory at block 600.

Similar steps are provided at block 602 for displaying and optionally clearing other stored errors, such as rinse-pump errors, and conveyor-motor errors. Various other error counts are displayed and optionally cleared as indicated at 602. The final displayed number of errors, i. e., the number of "low-water prewash" errors, is displayed until switch 270 is actuated. Upon such actuation, the display next provides at block 607 for the indication "CLR?". This presents the operator with the option to clear all stored error counts from memory, if this has not already been done for individual items. If switch 274 is actuated in response to this message, as determined at block 608, all errors are cleared from memory at block 610. If, on the other hand, switch 270 is actuated, the program returns directly to block 590.

The timer/sequencer routine 318 is shown in detail by reference to FIGS. 21A-21D. Execution of this routine is governed by a 10 millisecond timer such that at 10 millisecond intervals, microprocessor 244 jumps from main program loop 300 to timer/sequencer routine 318. After performing one loop through routine 318, the microprocessor moves back to the main program, resuming where it left off.

Routine 318 is initiated and reset at 612 upon the intial application of power to microprocess 244. An internal counter is set equal to 0 at 614.

Upon entering the program loop, the status of each input module is read into the microprocessor memory at block 616. Thus, it should be recognized that although previous description with respect to operation of the main program loop has discussed the obtaining of information from the various input modules, in fact such information is obtained from memory. The input modules are directly surveyed only in the timer/sequencer routine 318. Next, the status of current sensors 260, 262, 264, 266 and 268 are read into memory at block 618. Further, the conveyor position value is recalled at block 620.

As described previously, a conveyor position sensor switch 138 is provided for producing a series of pulses in response to conveyor movement. Signals from switch 138 are directed to microprocessor 244 and are accumulated as a conveyor position value, the value being incremented each time the switch 138 is actuated as a result of conveyor movement. Consequently, the conveyor position can be determined regardless of conveyor speed, the number of times the conveyor has been started or stopped, or coasting of the conveyor upon deactuation of conveyor drive motor 26. Of course, to avoid unnecessarily large numbers, a maximum count value is provided that is greater than the total length, in count increments, of the conveyor. Once this maximum count is reached, the next signal received resets the count to zero.

The present invention provides for sequenced control of the dishwashing machine in which various operations within the machine are carried out only when ware items are present at the stations along the machine in which such operations take place. While it should be recognized that each of the chambers shown in FIG. 1 can represent an individual station, in the preferred embodiment, prewash chamber 38, wash chamber 56 and rinse chamber 76 are all combined to form a single pump station to reduce the complexity of the control system. Accordingly, the pump station extends essentially from curtain 36 to curtain 94. A final rinse station extends from curtain 94 to curtain 106, and a drying station extends from curtain 106 to curtain 122.

The length of each station is stored within the memory as an integer number of increments of the distance between successive signals from conveyor position switch 138. Consequently, when a ware item passes sensor switch 124 at a specified conveyor position value, switch 124 serving as a reference point, the conveyor position at which the ware item will enter or exit a particular station can be determined by adding the distance from that point to the conveyor position value. Of course, when calculating the position for entrance or exit of ware into or out of a particular station, it may be necessary to subtract the maximum count value in the event the calculated value exceeds this number.

Returning now to FIG. 21A, after review of the conveyor position value at block 620, the program determines at block 622 whether the conveyor position value has changed since the last loop through the program. If not, the program continues on to additional steps but, if the value has changed, the program enters subroutine 623 and inquires at block 624 whether the current position value equals a stored pump station actuation value or start value. In other words, an inquiry is made to determine whether a ware item should now be entering the pump station. If so, the program actuates the pumps output module 236 at block 626 and clears the pump actuation value from memory at block 628. Assuming conditions are acceptable for actuation of the pump motors, both within operation of the main program loop 300 and the hardware controls shown in FIGS. 6A and 6B, pumping of water onto the ware within the pump station will be initiated.

If the current conveyor position value does not equal a stored pump actuation value, a check is made at block 630 to determine whether the value equals a stored pump deactuation value or stop value. If so, pumps output module 236 is deactuated at block 632, and the value is cleared from memory at block 634. If neither condition occurs, no action is taken.

Subroutine 623 begins again at block 636 to determine whether the current conveyor position value equals either a stored final rise actuation value or a stored final rinse deactuation value. In either event, appropriate action to actuate or deactuate the final rinse output module 238 is taken. Subroutine 623 also occurs beginning at block 638 with respect to the blower/dryer station and blower/dryer output module 240.

After any initiation or termination of operations as a result of movement of ware items along the conveyor is provided, the program next considers whether the dish sensor 124 indicates the presence of a ware item on the conveyor at the entrance end 20 to the dishwashing machine. It should be noted in this regard that the conveyor can be considered as comprising a plurality of sequential zones arranged along the conveyor in its direction of movement. Each zone corresponds to the portion of the conveyor moving past sensor switch 124 between sequential signals from conveyor position sensor switch 138. Since timer/sequencer routine performs the program loop once every 10 milliseconds, it can be seen that input from the dish sensor switch 124 is accepted a large number of times during any one zone along the conveyor. At typical conveyor speeds of 10 feet per minute, and with signals provided by position sensor switch 138 for approximately each 2.1" of movement, at least 200 scans of each zone will occur.

Each time the program loops through routine 318, the status of dish sensor 124 is read. If, immediately following three successive readings showing no ware present, three successive reading indicating that ware is present are received, it is assumed that the leading edge of a ware item has been detected. If, on the other hand, three successive readings indicating the presence of ware, it is assumed that a trailing edge has been detected.

Once a leading edge of a ware item is detected at block 640, the microprocessor enters subroutine 645 and as indicated at block 646, calcuates a pump actuation value that is equal to the current conveyor position value plus the distance in increments to the entrance to the pump station. As has been described, this pump actuation value will equal the conveyor position value once the sensed ware item has been moved to the entrance to the pump station. Once this occurs, pumping will begin through operation of the program as has been described beginning at block 622.

It should be recognized that since the stations within the dishwashing machine are greater than a single zone in length, it is possible for more than one occupied zone to be within the station at the same time. Accordingly, it is not sufficient simply to actuate and deactuate components such as pumps without regard to other ware items which may be present. Otherwise, it may be possible for a first ware item to enter, for example, the pump station whereupon the pumps will be energized. Prior to exit of the first ware item, a second item may enter the station, resulting in an additional actuation instruction to be sent to the pumps output module. This instruction will be ignored since the pumps are already functioning, and pumping will be continued. However, upon exiting of the first ware item from the station, the pumps will be deactuated. The second ware item will still be within the station, but pumping will have ceased.

To avoid this problem, the program moves to block 648 immediately after storing a new pump actuation value. An inquiry is made as to whether the new actuation value is between the values of the last stored pump actuation and deactuation values. If so, this will indicate that pumping will already be initiated when the newly sensed item arrives at the station entrance. Accordingly, the new value is not needed and is not stored. If the actuation value is between the last actuation and deactuation values, the pumps will need to be turned on when the ware enters the station and if this is not the case, the value is stored at block 650.

As an alternative, but equivalent approach, conflicts in actuation and deactuation values may be resolved at the time pumping is started and stoped, i.e., in the program in the vicinity of block 624. Conflicting values could be stored, and at the time pumping is about to be terminated, a check could be made as to whether an additional actuation value has been stored whose value is greater than the actuation value that started pumping but less than or equal to the deactuation value under consideration. If so, the deactuation value can be ignored.

If a trailing edge rather than a leading edge is detected at block 652, the program enters subroutine 651 and calculates at block 653 a deactuation value equal to the current conveyor position value plus the distance to the pump station exit. To avoid conflicting instructions, the program determines at block 654 whether the last value that was stored was an actuation value or a deactuation value. If an actuation value, it indicates that the pumps will be operating in response to the leading ege of a ware item when the trailing edge reaches the station exit, and accordingly, the pumps will need to be turned off. In such event, the new deactuation value is stored at block 655. If the last prior value stored was a deactuation value, however, it indicates that the pumps will be turned off prior to the emergence from the station of the newly-sensed trailing edge. To avoid such an occurrence, the prior deatuation value is replaced with the new value at block 656.

In effect, subroutines 645 and 651 cooperate so that, upon sensing a leading edge of a ware item, a new actuation value is calculted. Upon sensing of the trailing edge of the same ware item, a deactuation value is calculated. In the event that a previous deactuation value has been stored whose value is greater than or equal to the new actuation value, but less than the new deactuation value, the microprocessor is operative to eliminate the previous deactuation value. This takes place because the new actuation value is stored only if it does not fall between the most recent previous actuation and deactuation values. If it were to fall between such values, this would by definition place a deactuation value between the new actuation value and the new deactuation value. Therefore, since the new actuation value will not be stored, the last value stored will be a deactuation value, which will be replaced by the new value and therefore eliminated.

Having scheduled operation of the pump station for the newly sensed leading or trailing edge, similar steps are carried out by either subroutine 645 or 651 for the final rinse station at block 657 or 658, respectively, and for the dryer station at block 659 or 660, respectively. Thus, sequential operation upon the ware item as it moves through the dishwashing machine has been arranged.

It should be recognized that included within the scope of the present invention are various other methods of sequencing the operation of the various stations along the dishwashing machine. For example, a system included within the present invention could be designed wherein the microprocessor or other control means is not specifically responsive to leading and trailing edge of ware items. In such a case, the dish sensor 124 could scan each zone along conveyor 24 as it is moved past sensor 124. As each zone is moved past, it is determined whether that zone includes any ware items or portions thereof within the zone. If so, both an actuation value and a deactuation value for that zone are immediately calculated and stored. Thus, rather than starting, for example, pumping operations when the leading edge of a ware item reaches the pumping station, the system would be designed to commence pumping when an occupied zone entered the station. Of course, since many ware items will occupy two or more successive zones, it may be necessary to replace the previous deactuation value with one newly calculated as a result of the sensing of an occupied zone. However, this can be accomplished through a program similar to that described above.

Figure 21A:
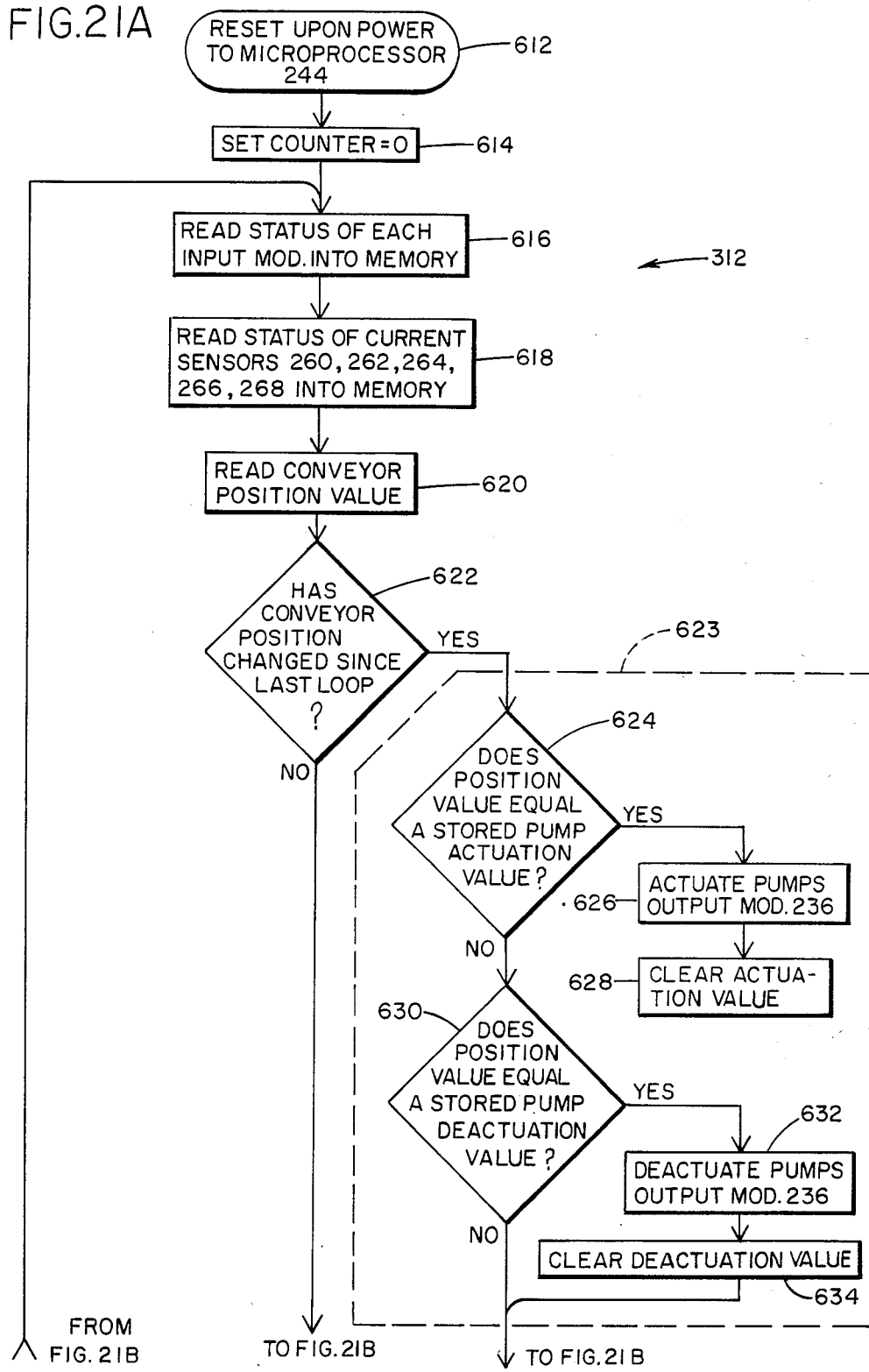
Figure 21B:
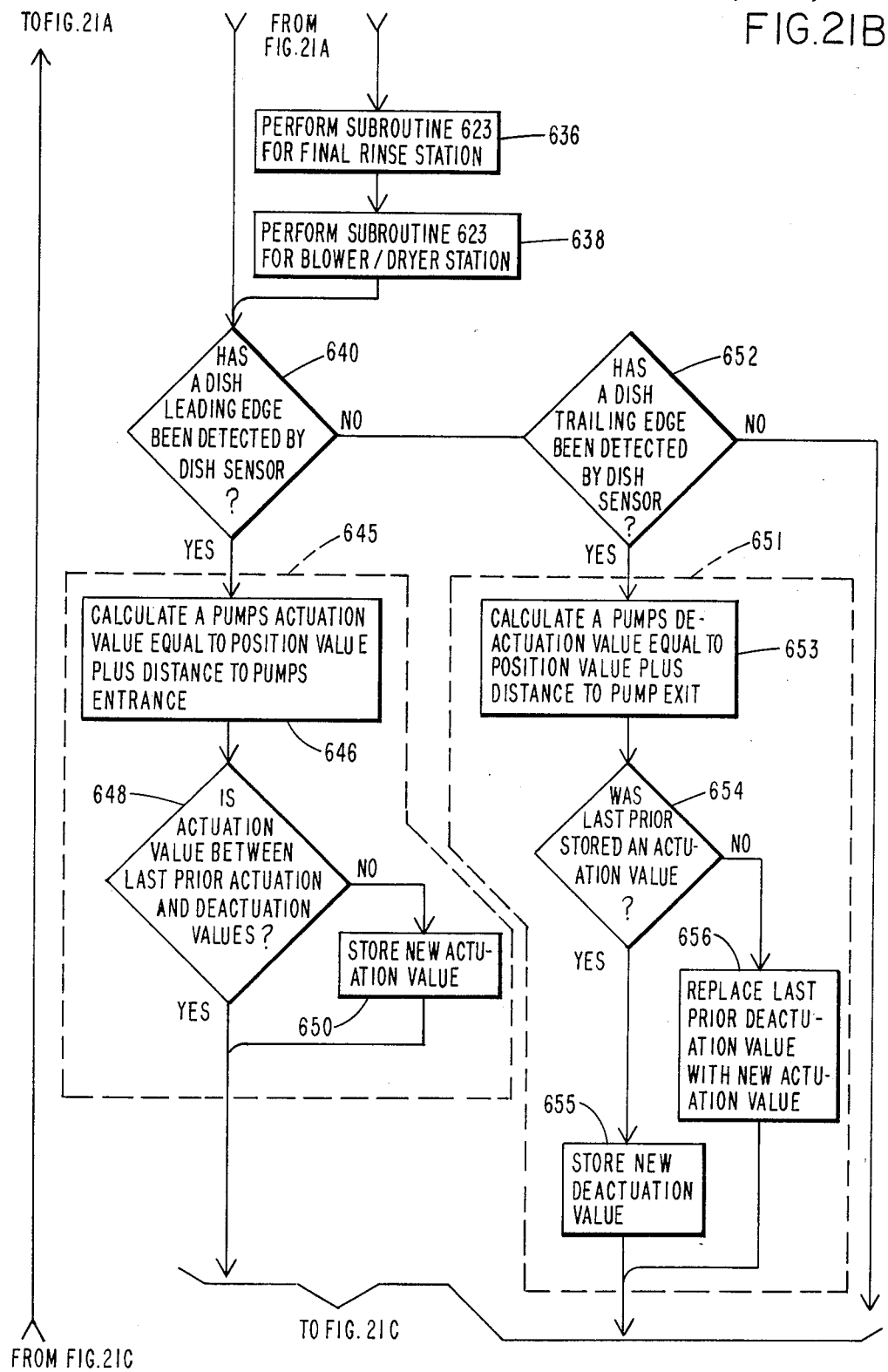
Figure 21C:
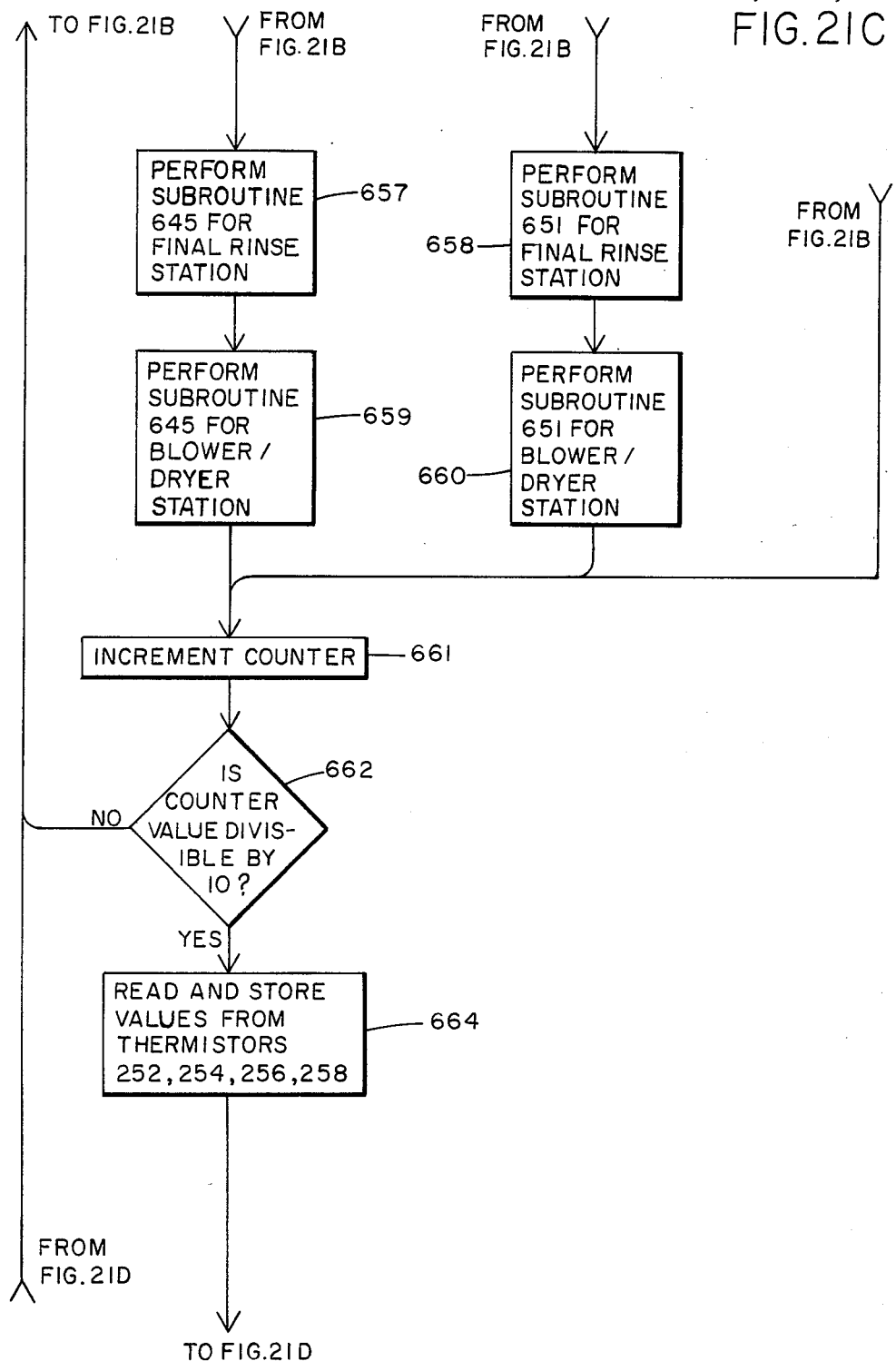
Figure 21D:
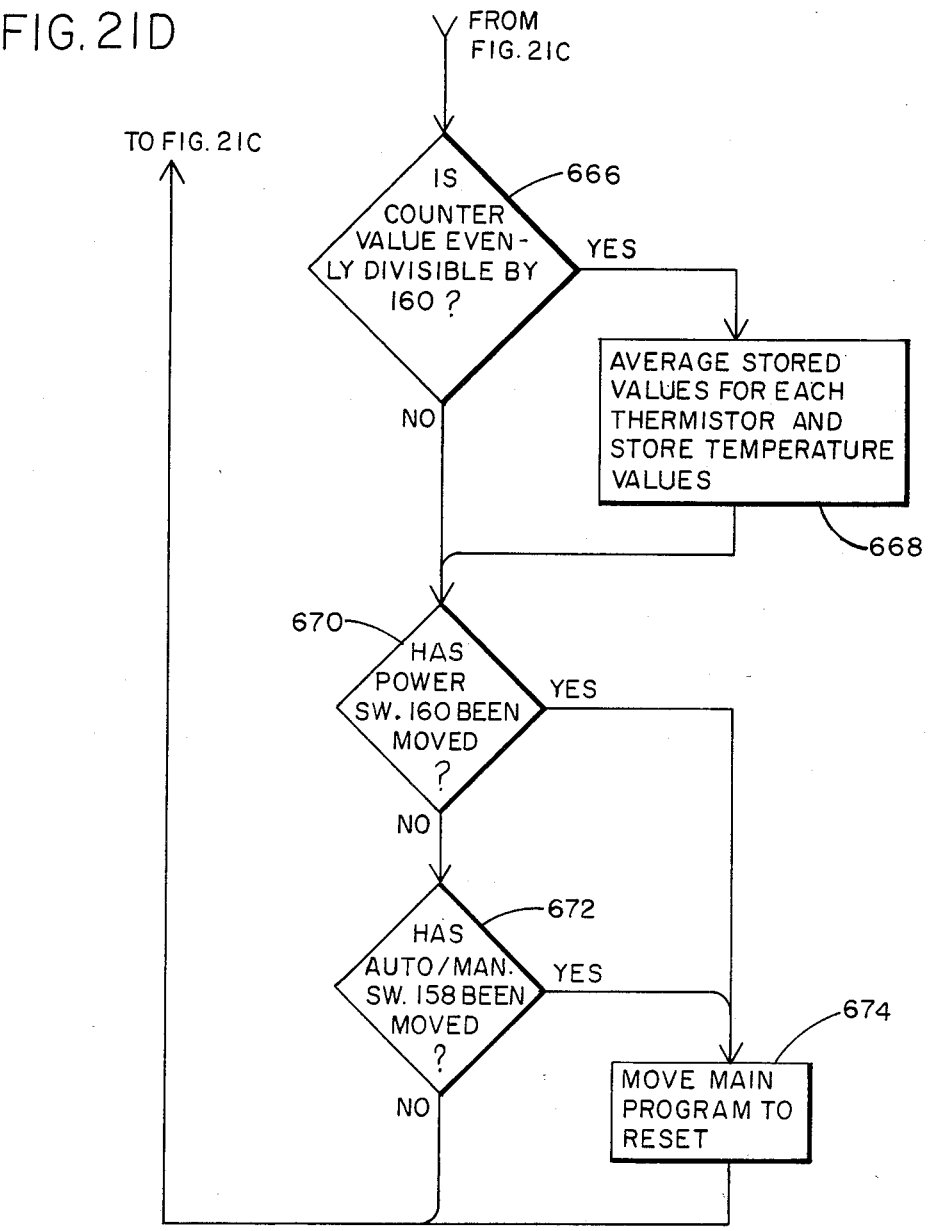

As shown at block 661 in FIG. 21C, the program next increments the counter. Thereafter, if as determined at block 662 the present counter value is not evenly divisible by 10, the program moves to block 616 to await the next loop through the program.

In the event the counter value is evenly divisible by 10, which will occur every 100 milliseconds, the value from each of thermistors 252, 254, 256 and 258 are read and stored as indicated at block 664. If the counter value is currently even divisible by 160, that is, every 1600 milliseconds, as indicated at block 666, the 16 stored values for each thermistor are averaged and stored as a current temperature value at block 668. This value is used thereafter for display purposes and for controlling operation of the wash heater and rinse heater until, after an additional 1600 milliseconds, new values are calculated.

Finally, a check is made at block 670 to determine whether power switch 160 has been moved since the last loop through this portion of the program. If not, a check is made at block 672 as to whether auto/manual switch 158 has been moved. If either event has occurred, the timer/sequencer routine causes the main program to be moved to reset routine 302 at block 674. The program then loops back to block 616.

While the methods herein described, and the form of apparatus for carrying these methods into effect, constitute preferred embodiments of this invention, it is to be understood that the invention is not limited to these precise methods and form of apparatus, and that changes may be made in either without departing from the scope of the invention, which is defined in the appended claims.

What is claimed is:

1. A control system for conveyor-type dishwasher having a plurality of sequentially arranged work stations, each of said stations having means for performing an operation on ware items located therein such as washing, rinsing, drying and the like, and a conveyor for carrying the ware items into said dishwasher, past each of said stations, and out of said dishwasher, whereby each of the ware items has defined therefor a leading edge and a trailing edge, said control system comprising:

sensor means mounted at a reference point adjacent said conveyor near the entrance for ware to said dishwasher for sensing the presence of ware items on said conveyor as the items are carried thereby past said reference point;

means for monitoring positional advance of said conveyor for defining a current conveyor position and tracking movement of said items through said dishwasher;

control means responsive to said sensor means and said monitoring means for starting said operation performing means within each of said stations in response to movement of said conveyor sufficient to carry said items from said reference point to said station, and for stopping said operation performing means in response to movement of said conveyor sufficient to carry said items from said station;

said monitoring means including means for defining a series of zones of equal size arranged sequentially along said conveyor in the direction of travel of the ware for movement with said conveyor, and means for providing a count having an initial count value and increasing said value incrementally for movement of each zone past said reference point to produce a changing current count value;

the distance along said conveyor from said reference point to the entrance to one of said stations being defined as a first integer number of said zones, and the distance along said conveyor from said reference point to the exit of said one station being defined as a second integer number of said zones;

said sensor means senses the presence of a leading edge and a trailing edge of a ware item as said ware item is moved past said reference point;

said control means is operative to, upon sensing the presence of said leading edge, add said first number to the current value of said count to produce a first start value, and to store and first start value;

said control means is operative to, upon sensing the presence of said trailing edge, add said second number to the current value of said count to produce a first stop value, and to store said first stop value; and said control means is further operative to, upon the current value of said count becoming equal to said first start value, commence operation within said one station, and upon the current value of said count becoming equal to said first stop value, halt operation within said one station.

2. The control system as defined in claim 1, wherein, upon production by said control means of said first start value and said first stop value, and in the event an additional stop value has been previously stored whose value is greater than or equal to said first start value but less than said first stop value, said control means is operative to eliminate said additional stop value.

3. The control system as defined in claim 1 wherein, upon the current value of said count becoming equal to said first stop value, and in the event an additional start value has been stored whose value is greater than said first start value but less than or equal to said stop value, said control means is operative to continue rather than halt operation within said one station.

4. A control system for a conveyor-type dishwasher having a plurality of sequentially arranged work stations, each of said stations having means for performing an operation on ware items located therein such as washing, rinsing, drying and the like, a conveyor for carrying the ware items into said dishwasher, past each of said stations, and out of said dishwasher whereby each of the ware items has defined therefor a leading edge and a trailing edge, and a reference point defined adjacent said conveyor near the entrance for ware to said dishwasher, said control system comprising:

means for defining a series of zones of equal size arranged sequentially along said conveyor in the direction of travel of the ware for movement with said conveyor;

means for providing a count value having an initial count value and for increasing said value incrementally upon movement of each of said zones past said reference point to produce a changing count value;

the distance along said conveyor from said reference point to the entrance to one of said stations being defined as a first integer number of said zones, and the distance along said conveyor from said reference point to the exit of said one station being defined as a second integer number of said zones;

sensor means for sensing the presence of a leading edge and a trailing edge of a ware item as said ware item is moved past said reference point; and control means responsive to said sensor means and said count means for, upon sensing the presence of said leading edge, adding said first number to the current value of said count to produce a first start value and storing said first start value upon sensing the presence of said trailing edge, adding said second number to the current value of said count to produce a first stop value and storing said first stop value, and in the event an additonal stop value has been previously stored whose value is greater than or equal to said first start value but less than said first stop value, eliminating said additional stop value;

said control means further being constructed to control the operation performing means at said one station such that upon the current value of said count becoming equal to said start value, operation within said one station is commenced, and upon the current value of said count becoming equal to said first first stop value, operation within said one station is halted.

5. The control system as defined in claim 4, wherein said control means is further constructed such that said first start value is stored unless an additional start value has been previously stored and said first start value is greater than said additional start value and less than said additional stop value, whereupon said first start value is eliminated.

6. The control system as defined in claim 4, wherein said zone defining means includes a plurality of markers mounted in an equally-spaced series for movement along a movement path during movement of said conveyor, and detector means mounted adjacent said movement path for detecting the passage of each of said markers and generating a signal pulse in response thereto, each of said zones being defined as the portion of said conveyor moving past said reference point between two successive ones of said signal pulses.

7. The control system as defined in claim 6, wherein said count means includes said markers and said detector means, said count value being increased incrementally upon generation of each of said signal pulses.

8. The control system as defined in claim 7, wherein said dishwasher further includes a motor and drive means connecting said motor with said conveyor for driving said conveyor, and wherein said zone defining means further includes a member driven by said drive means, said markers being mounted on said member.

9. The control system as defined in claim 8, wherein each of said markers includes a magnet and said detector means includes a Hall effect switch.

10. The control system as defined in claim 8, wherein said sensor means includes source means mounted adjacent said conveyor substantially at said reference point for generating a beam of elecromagnetic radiation and directing said beam across said conveyor, and receiving means mounted across said conveyor from said source means for continuously receiving said beam except when a ware item moved past said reference point by said conveyor interrupts said beam, thereby indicating the presence of said item.

11. The control system as defined in claim 10, wherein said beam is directed across said conveyor at other than a right angle to the conveyor path.

12. The control system as defined in claim 4, wherein said sensor means is operative to define a positive status in which ware is present at said reference point and a negative status in which no ware is present, and wherein said control means is responsive to said sensor means by determining a current status of said sensor means at uniform timed intervals of predetermined duration, said duration being selected such that a plurality of said intervals will occur as each of said zones is moved past said reference point.

13. The control system as defined in claim 4, further comprising switch means connected with said control means, said control means being responsive to said switch means such that upon actuating of said switch means, said control means ignores said first start value and said first stop value and causes said operation performing means within said one station to operate whenever said conveyor is in operation.

14. A method of controlling a conveyor-type dishwasher having a plurality of sequentially arranged work stations for performing operations on ware items located therein comprising washing, rinsing, drying operations and a conveyor for carrying the ware items into said dishwasher, past each of said stations, and out of said dishwasher, whereby each of the ware items has defined thereon a leading edge and a trailing edge, the method comprising the steps of:

defining a reference point along said conveyor near the entrance for ware to said dishwasher;

defining a series of zones of equal size arranged sequentially along said conveyor in the direction of travel of the ware for movement with said conveyor;

providing a count having an initial value and increasing said value incrementally for movement of each zone from said reference point to produce a changing current value;

determining, as a first number of said zones, the distance from said reference point to the entrance to one of said stations, and as a second number of said zones, the distance from said reference point to the exit from said one station;

sensing to detect the presence of a leading edge and a trailing edge of a ware item ware items as said ware item is moved past said reference point;

upon detecting the presence of said ledging edge, adding said first number to the current value of said count to produce a start value, and storing said start value, upon detecting the presence of said trailing edge, adding said second number to the current value of said count to produce a first stop value and storing said first stop value and, in the event an additional stop value has been previously stored whose value is greater than or equal to said start value but less than said first stop value, eliminating said additional stop value;

upon the current value of said count becoming equal to said first start value, commencing operation within said one station; and upon the current value of said count becoming equal to said stop value, halting operation within said one station.

* * * * *

UNITED STATES PATENT AND TRADEMARK OFFICE
CERTIFICATE OF CORRECTION

PATENT NO. : 4,561,904
DATED : December 31, 1985
INVENTOR(S) : Mark E. Eberhardt, Jr.

It is certified that error appears in the above-identified patent and that said Letters Patent is hereby corrected as shown below:

Col. 2, line 26, "whicn" should be -- which --.
Col. 6, line 23, "Tnis" should be -- This --.
Col. 7, line 51, "oy" should be -- by --.
Col. 8, line 60, "switcnes" (first occurrence) should be -- switches --.
Col. 9, line 1, "Tnus" should be -- Thus --.
Col. 11, line 18, after "Finally", insert -- return routine 316 returns the microprocessor to heat --.
Col. 27, line 33, "actuating" should be -- actuation --.

Signed and Sealed this

Twenty-ninth Day of April 1986

[SEAL]

Attest:

DONALD J. QUIGG

Attesting Officer

Commissioner of Patents and Trademarks